US011496202B2

(12) United States Patent
Kotecha et al.

(10) Patent No.: US 11,496,202 B2
(45) Date of Patent: Nov. 8, 2022

(54) FAST AND ROBUST CELL SEARCH FOR 5G AND MILLIMETER-WAVE WIRELESS COMMUNICATION SYSTEMS USING JOINT FREQUENCY RASTER AND RECEIVE BEAM SEARCH

(71) Applicant: NXP USA, Inc., Austin, TX (US)

(72) Inventors: Jayesh H. Kotecha, Austin, TX (US); Jayakrishnan C. Mundarath, Austin, TX (US)

(73) Assignee: NXP USA, INC., Austin, TX (US)

( * ) Notice: Subject to any disclaimer, the term of this patent is extended or adjusted under 35 U.S.C. 154(b) by 497 days.

(21) Appl. No.: 16/414,267

(22) Filed: May 16, 2019

(65) Prior Publication Data

US 2020/0366360 A1    Nov. 19, 2020

(51) Int. Cl.
*H04B 7/08* (2006.01)
*H04B 7/06* (2006.01)
*H04J 11/00* (2006.01)
*H04B 7/0456* (2017.01)
*H04L 27/26* (2006.01)
*H04B 17/318* (2015.01)

(52) U.S. Cl.
CPC .......... *H04B 7/086* (2013.01); *H04B 7/0456* (2013.01); *H04B 7/0682* (2013.01); *H04B 17/318* (2015.01); *H04J 11/0086* (2013.01); *H04L 27/2655* (2013.01)

(58) Field of Classification Search
CPC .... H04B 7/0413; H04B 7/086; H04B 7/0897; H04B 7/0682; H04B 7/0456; H04B 17/318; H04L 27/2655
See application file for complete search history.

(56) References Cited

U.S. PATENT DOCUMENTS

| | | | |
|---|---|---|---|
| 2012/0196591 A1* | 8/2012 | O'Keeffe | H01Q 1/246 455/427 |
| 2017/0222693 A1* | 8/2017 | Shen | H04B 7/0408 |
| 2018/0131434 A1* | 5/2018 | Islam | H01Q 1/246 |
| 2018/0199258 A1* | 7/2018 | Cezanne | H04B 7/0404 |
| 2019/0058558 A1* | 2/2019 | Lee | H04W 16/28 |

OTHER PUBLICATIONS

Aymen Omri, Mohammed Shaqfeh, Abdelmohsen Ali, and Hussein Alnuweiri, Synchronization Procedure in 5G NR Systems, 7 IEEE*Access* 41286-41295 (Mar. 28, 2019), Digital Object Identifier 10.1109/ACCESS.2019.2907970.*

(Continued)

*Primary Examiner* — Said M Elnoubi

(57) ABSTRACT

A wireless multiple antenna system (200) uses a multi-antenna subsystem (211) to generate a composite sample waveform by continuously sweeping a plurality of receive beams (RX1-RXM) during each SSB transmission in a plurality of transmit beams (TX1-TX64), generating a composite received signal strength metric value from a batch of samples collected over the plurality of receive beams to determine the presence of the SSB, and then jointly searching the composite sample waveform for an optimal receive beam and an SSB frequency of any detected SSB that are used by the UE (210) to perform a cell search which matches a transmit beam from the base station (201) to the optimal receive beam.

20 Claims, 9 Drawing Sheets

(56) References Cited

OTHER PUBLICATIONS

V. Desai et al., "Initial Beamforming for mmWave Communications," in 48th Asilomar Conference on Signals, Systems and Computers, Nov. 2014.
M. Giordani et al., "Comparative Analysis of Initial Access Techniques in 5G mmWave Cellular Networks," Annual Conference on Information Science and Systems (CISS), 2016.
C. N. Barati et al., "Directional Initial Access for Millimeter Wave Cellular Systems," Annual Conference on Information Science and Systems (CISS), 2016.
J. Kim et al, "Fast Millimeter-Wave Beam Training with Receive Beamforming," Journal of Communications and Networks, vol. 16, No. 5, Oct. 2014.

* cited by examiner

FAST AND ROBUST CELL SEARCH FOR 5G AND MILLIMETER-WAVE WIRELESS COMMUNICATION SYSTEMS USING JOINT FREQUENCY RASTER AND RECEIVE BEAM SEARCH

BACKGROUND OF THE INVENTION

Field of the Invention

The present invention is directed in general to field of information processing. In one aspect, the present invention relates to an apparatus, system and method for initial cell acquisition in next generation millimeter-wave cellular communication systems.

Description of the Related Art

Wireless communication systems transmit and receive signals within a designated electromagnetic frequency spectrum, but the capacity of the electromagnetic frequency spectrum is limited. As the demand for wireless communication systems continues to expand, there are numerous technical challenges to increasing throughput in wireless communication links. With next-generation wireless systems, such as the 5G wireless network technologies being deployed, millimeter-wave (mm-wave) data transmission has emerged as a highly promising approach to achieving gigabit/s throughput in wireless communications links by offering orders of magnitude more spectrum than the congested bands in conventional UHF and microwave frequencies below 3 GHz. However, with extremely high carrier frequencies, mm-wave signals experience poor propagation and high path-loss. To overcome the large isotropic path loss, mm-wave signal schemes rely heavily on highly directional transmissions, such as by using electrically steerable antenna elements to implement beamforming techniques for enhancing cell coverage by directionally transmitting and receiving mm-wave communications. However, the use of directional transmissions significantly complicates the requirement of initial access—the procedure by which a mobile (or user equipment (UE) in 3GPP terminology) discovers a potential cell and establishes a link-layer connection with the corresponding base station (BS). To enable mutual detection between the BS and the UE, the initial access procedure in mm-wave cells must provide a mechanism by which both the UE and the BS can determine suitable beamforming directions on which subsequent directional communication can be carried out. Directional beamforming transmissions typically have a tradeoff between coverage range and beamwidth/number of transmission beams since the use of narrower beams to realize very high beamforming gains requires a larger number of beam directions, which in turn slows down the initial access process due to larger angular search requirements. This increase in delay goes against one of the main objectives of mm-wave systems, which is to dramatically reduce both data plane and control plane latency.

There are various mm-wave initial access design proposals for establishing initial beamforming directions between the UE and the BS. For example, the 5G wireless standards specify an initial access scheme where a base station (gNB) uses a fixed time and frequency grid to transmit a plurality of synchronization signal blocks (SSB) on differentially directed TX beams to identify the TX beams that are available for initial access. However, the frequency location for transmitted SSBs can vary over deployments and vary semi-statically within a given deployment, making it difficult for the UE to make initial cell acquisition. This technical challenge adds to the other design challenges on the receive side with providing a robust cell search/acquisition strategy/procedure since existing solutions must balance the acquisition time (latency constraint) against the acquisition probability (coverage constraint). For example, increases in acquisition probability (and thus, coverage) are typically achieved by using the sharpest receive beams possible, which in turn proportionally scales up the number of receive beams to search over, thereby increasing the acquisition time. With a brute force solution of searching over all receive beams, the best coverage is achieved, but at the expense of a maximum worst case (and average) latencies. These worst case latencies are also linearly proportional to the number of transmission beams using by the base station. And while latency can be reduced by compacting the search space to search over wider (but fewer) beams, this will result in reduced coverage. As seen from the foregoing, the existing initial access solutions for mm-wave systems are extremely difficult at a practical level by virtue of the challenges with performing fast and robust cell searches for 5G and mm-wave wireless communication systems, especially as the number of transmit and receive beams increase with next-generation wireless systems, increasing directional initial access tradeoffs between delay performance and coverage.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
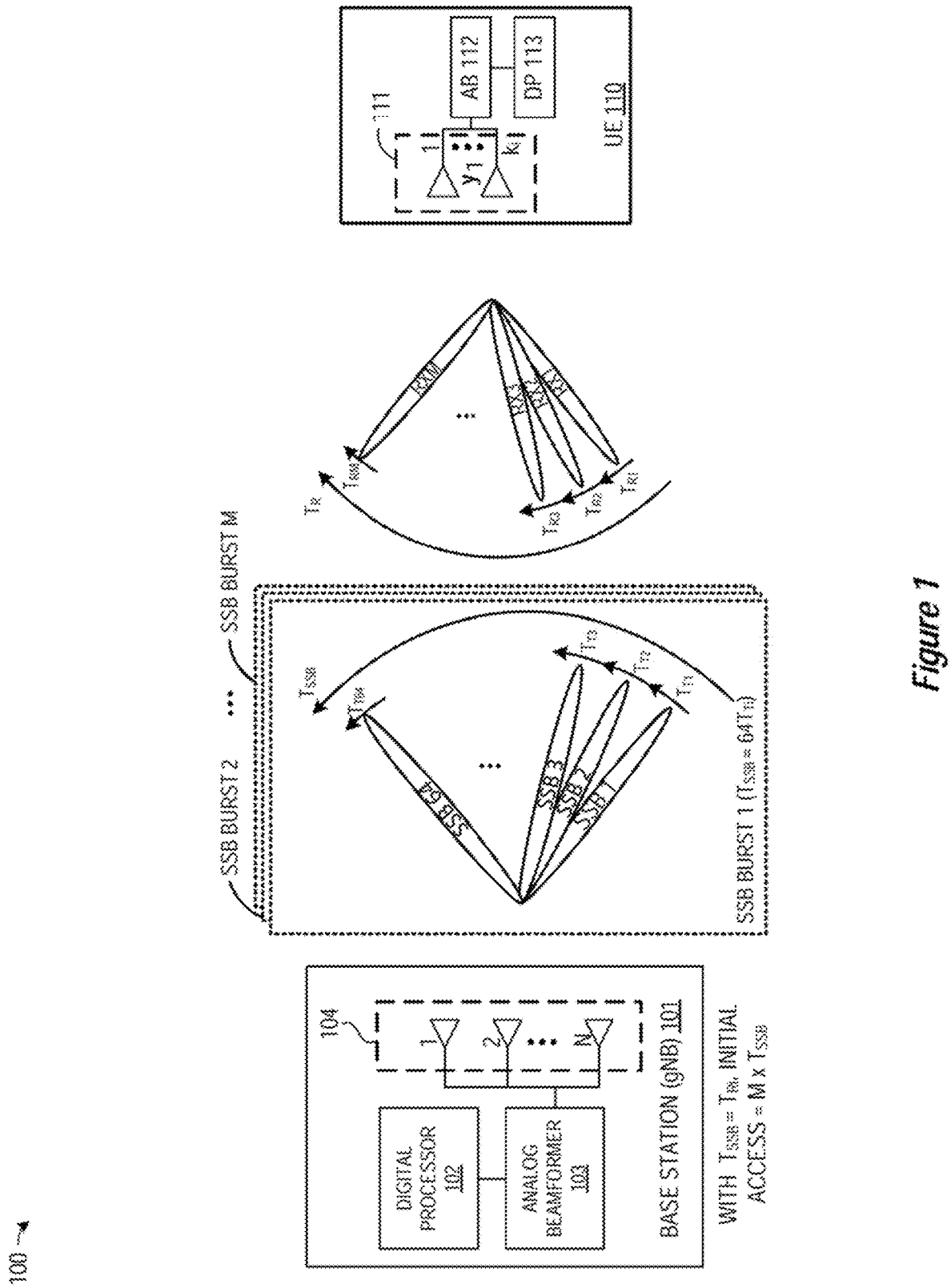
FIG. 1 depicts a wireless communication system which uses a conventional synchronization procedure between a base station (BS) and user equipment (UE).

An apparatus, system, architecture, methodology, and program code are described for continuously sweeping receive (RX) beams to compute composite received signal strength indicator (RSSI) metric values for use in jointly detecting the SSB frequency band and the optimal transmit and receive beams in a multi-stage process for accurately and efficiently performing a cell search at the user equipment side (UE) for next generation mm-wave cellular systems, including but not limited to 5G New Radio (5G-NR). In a first stage computation, the UE continuously sweeps through all of its RX beams with a sweep period that equals the duration of each SSB transmit (TX) beam to generate a composite sample waveform which is then processed to compute (composite) received signal strength indicator (RSSI) metric values which are then transformed into the frequency domain to detect the synchronization signal block (SSB) frequency band location based on a correlator sweep in the frequency domain of the SSB raster. In a second stage computation, raster band filtering is applied to each estimated RX beam within each frequency sub-band, and the resulting filtered signal is used to compute a per-beam, per-frequency-sub-band RSSI metric value for each swept RX beam to identify the optimal RX beam within the "correct" frequency sub-band having the highest RSSI metric value. In the third stage computation, the UE locks on to the identified RX beam(s) and to the identified frequency sub-band to perform a synch-based acquisition with the base station, such as by performing a cell-search round that uses the identified RX beam to search for a synch pattern on the strongest transmit (TX) beam.

To identify the estimated RX beam and detect the SSB frequency location in the first stage computation, the UE may include an analog filtering multi-antenna millimeter-wave subsystem and analog beamforming array which is reconfigurable to continuously collect samples by listening across the "M" RX beams in a time-multiplexed, round robin manner during each transmitted SSB of an SSB burst to generate a composite sample waveform, and to compute therefrom composite RSSI metric values over every set of $N_{SSB}$ samples which equals the size of the SSB window in time. Using the composite RSSI metric values to identify possible SSB signals which have composite RSSI metric values exceeding a first threshold $RSSI_{CTh}$, the UE transforms the possible SSB signals into the frequency domain and sweeps a correlator across the SSB raster to identify correlator peaks which exceed a threshold, thereby indicating the SSB frequency in the detected raster location. In selected embodiments of the first stage operation, the UE may scan one or more frequency sub-band portions of the total SSB frequency raster, either by using a first hierarchical approach for tuning the UE to sweep across B frequency sub-bands for each receive beam listening period, or by using a second hierarchical approach for configuring the UE to sweep across M receiver beams while tuned to each of one or more frequency sub-bands. In such embodiments, there is no need to perform a correlator sweep to find the best frequency location.

To identify the optimum RX beam in the second stage computation for each detected SSB, a user equipment receiver filters the time domain signal for each detected SSB at its corresponding band and then calculates specified RSSI measurements on each RX beam during a first SSB burst. To calculate the per-beam RSSI values, each transmitted SSB of the first SSB burst is processed at the UE with a millimeter-wave transceiver/receive front end and associated antenna signal processor which performs receive signal processing on M sets of samples received from the transceiver/front end to calculate RSSI values for each of M RX beams. For example, the antenna signal processor may use a vector processor to initialize a metric vector $r_M=[0\ 0\ \ldots\ 0]^T$ and then generate a plurality of receive vectors—$(x_n=[x(nN_{SSB})\ x(nN_{SSB}+1)\ \ldots\ x(nN_{SSB}+N_{SSB}-1)]^T$, $c_{n,m}=[x(nN_{SSB}+mK)\ x(nN_{SSB}+mK+1)\ \ldots\ x(nN_{SSB}+mK+K-1)]^T$, and $z_{n,m}=[c_{n-1,m}^T\ c_{n,m}^T]^T$—from the input sample stream to compute a power measure, $p(n,m)=\max_{l\in(0,1,\ldots,K)}\|z_{n,m}(l)\|^2$ for each $m=0, 1, \ldots, M-1$ for every round robin period, n—in order to update the metric vector $r_M(m)=p(n,m)$, if $p(n,m)>r_M(m)$, for each $m=0, 1, \ldots, M-1$ through an iterative loop sequence that is repeated by incrementing "n" for a full SSB burst period. Here, $N_{SSB}$ refers to the number of samples gathered in a duration equal to the length of a SSB, and in the selected embodiment as described above, a single round robin RX sweep period is chosen to be equal to $N_{SSB}$. To account for possible misalignments between sample collection and the SSB boundary edges, RSSI measurements may be accumulated over multiple RX sweep periods to look for peaks in "adjacent sweep blocks." After completion of sampling the SSB burst(s), the metric vector $r_M$ is sorted to identify the "best" RX beam having the largest power metric value, at which point, the UE may fix the identified "best" RX beam to perform a correlation-based cell search to identify the best SSB transmit beam. Thus, the antenna signal processor may be embodied with program code running in the processor (or a host CPU) and/or hardware accelerator circuitry to control the first round of "quick" sweeps across "M" RX beams to make RSSI measurements for identifying the best "RX" beam based on the beam that picks up maximum power. As will be appreciated by those skilled in the art, the above-described approach can readily be generalized for any length of a single RX beam round robin sweep period that is less than or equal to $N_{SSB}$ in which multiple RSSI measurements may be made for each RX beam. In selected embodiments where a user equipment has limited frequency bandwidth receiver capability, the RSSI (or some such power or energy metric) may be calculated on candidate frequency domain bands corresponding to a one or more portions of the transmitted signal bandwidth. In such cases, the above described metric vector, $r_M$, is computed over each of the candidate frequency domain bands and the optimal RX beam and optimal frequency band are selected by looking for a global maximum across the multiple metric vectors calculated per band. The second stage computation will, thus, identify the best RX beam and the best frequency band. For processing through the subsequent stages, the UE locks the beamformer to the best identified RX beam and the analog/digital frequency tuner to the best identified frequency band.

To identify the optimum TX beam in the third stage computation, a user equipment receiver processes each SSB identified from the first stage computation to synchronize the time and frequency. For time and frequency synchronization with the gNB, the analog filtering multi-antenna millimeter-wave subsystem and analog beamforming array are configured to use the optimum RX beam before completing the remaining cell search procedure (PSS/SSS detection and BCH decoding) such that samples are first filtered with the bandpass filter for the detected SSB band.

To provide additional details for an improved contextual understanding of the present disclosure, reference is now made to FIG. 1 which depicts a wireless communication system 100 in which a base station (BS) 101 and user equipment (UE) 110 are each equipped, respectively, with transmit/receive multi-antenna array systems 104, 111. In a given geographic area, the wireless communication system 100 may include one or more transmitters 101 (e.g., base stations) to communicate with one or more receiver stations 110 (e.g., subscriber stations) by equipping the base station(s) 101 and subscriber station(s) 110 with transmitters and receivers. In selected embodiments, the base station 101 uses beamforming techniques to transmit one or more data streams through the transmit antenna array 104, and the receiver 110 combines the received signal stream(s) from the receive antenna array 111 to reconstruct the transmitted data. This is accomplished with "beamforming" weights whereby each data signal $s_i$ is processed by a digital signal processor 102 and analog/digital beamformer 103 for transmission by applying a weight vector $w_i$ to the signal $s_i$ and transmitting the result $x_i$ over the transmit antenna array 104. The weighting vector $w_i$ is used to directionalize the signal with the objective of enhancing the signal quality or performance metric, like signal-to-interference-and-noise ratio (SINR) of the received signal at the receiver station 110. At the receiver station 110, the received signals detected at the receive antenna array 111 are processed using a combining vector $v_i$ that is applied by the analog beamformer units (AB) 112 and digital signal processor (DP) 113. In an example embodiment where the base station 101 has an array of N transmit antennas 104, the digital signal processor 102 and analog beamformer 103 prepare a transmission signal, represented by the vector $x_i$, for each signal $s_i$. The transmission signal vector $x_i$ is determined in accordance with equation $x_i = w_i \cdot s_i$, where $w_i$ is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 104.

At the subscriber station 110, the transmitted signals are received on the $k_i$ receive antennas in the receive antenna array 111. For example, the transmission signal vector $x_1$ is transmitted via a channel represented by a channel matrix $H_1$, and is received at the receiver 110 as a receive signal vector $y_1 = H_1^H x_1 + n_1$, where $n_1$ represents noise and any co-channel interference caused by other subscriber stations, and "$H_1^H$" represents the complex conjugate transpose of the channel matrix correlating the base station 101 and the subscriber station 110. The superscript "H" is used herein as a Hermitian operator to represent a complex conjugate transpose operator. The $j^{th}$ element of the received signal vector $y_1$ represents the signal received on the $j^{th}$ antenna of subscriber station 110, $j \in \{1, 2, \ldots, k_i\}$. To obtain a data signal, $z_1$, which is an estimate of the transmitted data $s_1$, the digital signal processor (DP) 113 and analog beamformer (AB) 112 at the subscriber station 110 combine the signals received on the $k_i$ antennas of the array 111 using a combining vector $v_1$ in accordance with the equation, $z_1 = y_1^H v_1$.

With emerging 5G wireless communications, massive MIMO techniques are proposed for using antenna arrays 104, 111 which include arrays of elements driven by individual signals to create multiple signal beams over multiple paths. At the location of the receiver 110, signals from all these paths may be added constructively to enabling a high data rate by using multichannel phase shifting techniques to combine the signals from the multiple paths. In selected analog antenna embodiments, multichannel phase shifting can be done in the analog domain, by taking the transmit data stream, dividing it as many ways as there are elements in the antenna array, and then applying phase shifting to each of them. But due to the inflexibility of such analog systems which can only handle one data stream and generate therefrom one signal beam, another digital antenna approach provides each element of the antenna array with its own transceiver and set of data converters, thereby providing the ability to handle multiple data streams and generate multiple beams from one array.

With the increasing reliance on directional transmit and receive beamforming techniques for overcoming high isotropic path loss with next generation mm-wave cellular communication systems, such as 5G-NR, there are associated control and setup challenges for such systems. For example, initial access procedures can be significantly delayed due to the need for the BS and the UE to find the initial directions of transmission. With typical cell acquisition techniques where the UE 110 relies on a synchronization signal block (SSB) to acquire initial access, the base station (gNB) 101 will transmit, periodically or aperiodically, the SSB on each beamformed TX beam, thereby forming an SSB burst which has a specified SSB duration (specifying the total time for transmitting SSBs spanning the entirety of all supported TX beams/directions) and a specified SSB period (specifying the periodic repetition rate between SSB bursts). In the example of FIG. 1, each SSB burst includes SSB transmissions that are sent on N=64 TX beams (e.g., SSB 1-SSB 64). With each SSB transmission having a fixed length ($T_B$) occurring within a time span of fixed duration ($T_{Ti}$), the multiple SSB transmissions ($T_{T1} + T_{T2} + \ldots T_{T64} = T_{SSB}$) in each SSB burst will have a specified SSB burst duration (e.g., 5 ms) that is less than the SSB burst period, $T_{SSBPERIOD}$, (e.g., 20 ms) for periodically repeating each SSB burst.

With conventional synchronization protocols, the UE 110 can listen for an SSB transmission on one its configurable RX beams by tuning its antenna array system 111 to listen for an SSB burst on each RX beam. For example, if M is the maximum number of RX beams that the UE 110 can support, then the UE may configure the antenna array system 111 to listen on a first receive beam RX1 during a first SSB burst, and then to listen on a second receive beam RX2 during a second SSB burst, and so on until the antenna array system 111 is configured to listen on the Mth receive beam RXM during an Mth SSB burst. As a result, the period of an SSB burst ($T_{SSBPERIOD}$) corresponds roughly to the duration of each RX beam ($T_{Ri}$), resulting the total time for making initial access as $M \times T_{SSBPERIOD}$. While such an initial access approach maximizes the acquisition probability (coverage constraint) by using the sharpest RX beams possible, it does so at the expense of the acquisition time (latency constraint).

And the design challenge for providing a robust cell search/acquisition strategy/procedure which minimizes the acquisition time (latency constraint) while maximizing the acquisition probability (coverage constraint) are made even more difficult as the number of RX beams increases, thereby increasing the acquisition time required to search over all RX beams. While some initial access solutions have proposed to reduce the latency by compacting the search space at the UE to search over wider (but fewer) beams, this approach will reduce the coverage without minimizing acquisition latency.

Figure 2A:
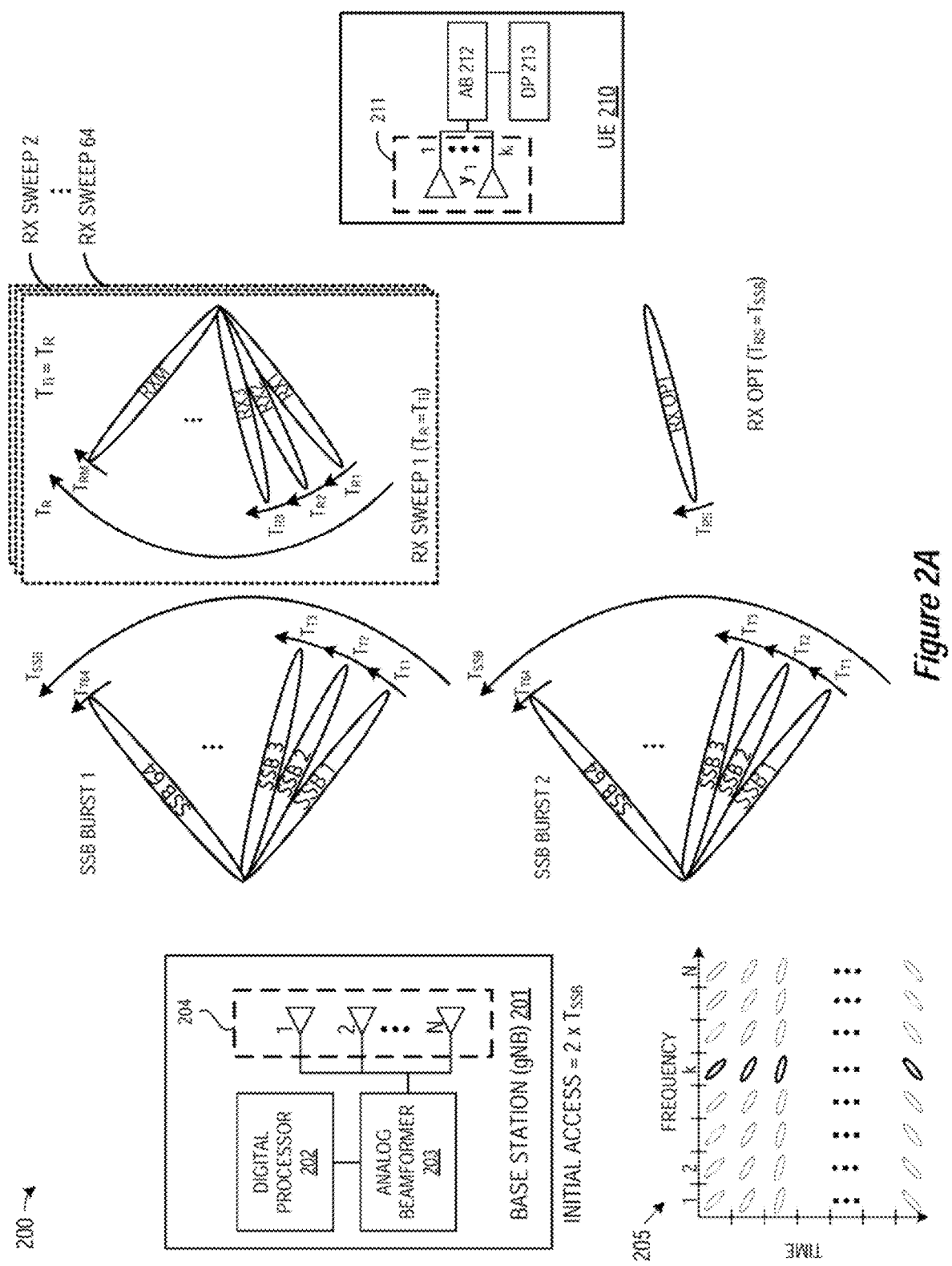
FIG. 2A depicts a wireless communication system which uses a joint search method for SSB frequency raster and RX beam to provide a fast and robust cell search synchronization procedure between a base station and user equipment in accordance with selected embodiments of the present disclosure.

To address these design challenges and other limitations from conventional approaches for making initial acquisition, reference is now made to FIG. 2A which depicts a wireless multi-antenna communication system 200 in which selected embodiments of the present disclosure may use a joint search method for SSB frequency raster and RX beam to provide a fast and robust cell search synchronization procedure between a base station 201 and user equipment 210. Equipped with one or more digital signal processor units 202, analog beamformer units 203, and transmit antenna array 204, the base station 201 is configured to periodically transmit a synchronization signal block (SSB) on each of a plurality of N transmit beams (e.g., SSB 1-SSB 64) as part of an SSB burst which has a SSB burst duration ($T_{SSB}$) and periodic SSB burst period ($T_{SSBPERIOD}$). As will be appreciated, the combination of SSB transmissions over every transmit beam during an SSB burst has a total SSB burst duration of $T_{SSB}=T_{T1}+T_{T2}+\ldots T_{T64}$, so that SSB bursts are transmitted regularly with a SSB burst period $T_{SSBPERIOD}$ that is longer than the SSB burst duration $T_{SSB}$. Having a fixed length or duration, each SSB transmission in a transmit beam may be transmitted within a fixed time period (e.g., $T_{T1}, T_{T2}, \ldots T_{T64}$) on a given time and frequency grid, such as the example time/frequency grid 205 which shows that the temporal sequence of SSB transmit beam weights can be transmitted in any of SSB frequency slots 1-N, with frequency slot "k" being identified with solid lines as transmit frequency slot for a given SSB. While selected embodiments illustrated in FIG. 2A show the use of analog beamformer techniques to transmit SSB bursts, it will be appreciated that digital beamformers can also be used to control the antennas 204.

To expedite the initial acquisition process, the user equipment 210 is equipped with analog beamformer (AB) 212 and digital signal processor (DP) 213 which implement a multi-stage cell search process. While the depicted embodiments show the use of analog beamformer techniques to receive and detect SSB bursts, it will be appreciated that digital beamformers can also be used to control the antennas 211. Whichever beamforming techniques are used, the user equipment continuously sweeps across all M RX beams (e.g., in a circular round robin manner) throughout the duration of each SSB burst period during a first stage to compute composite RSSI metric values over every set of samples covering M RX beams which are compared to a threshold RSSI value to identify candidate SSB signals. In other embodiments, the first stage processing may be extended to span multiple SSB bursts at the end of which the composite RSSI metric values are used to identify candidate SSB signals. Jointly in the first stage computation, the sampled waveform is processed to identify the frequency of any detected SSB by transforming the sampled waveform into the frequency domain to perform a search of the SSB frequency raster. In selected embodiments, the frequency search is performed by computing a Fast Fourier Transform (FFT) over each overlapped batch of samples in which the batch size corresponds to the FFT size, and then sweeping a correlator waveform in the frequency domain on the defined SSB raster to detect any correlator peaks which exceed a specified minimum threshold. As will be appreciated, the thresholds may be tuned or selected based on the automatic gain control tuning and noise power of the received signals.

To implement the first stage of the cell search, the digital signal processor (DP) 213 and analog beamformer (AB) 212 configure the receive antenna beamforming weights to continuously sweep across all M receive beams (e.g., RX1-RXM) such that the length of each sweep period $T_R$ (a single period covering all M RX beams) is aligned to the length of an SSB transmission in a single transmit TX beam. In other words, the duration of the initial sweep at the user equipment 210 ($T_R$) corresponds roughly to the fixed duration of each SSB transmission ($T_B$). This reflects the fact that SSB transmissions on different TX beams will have the same SSB duration, but are not necessarily continuous or distributed evenly with the SSB burst. As a result, two successive SSB transmissions on two different TX beams will occur at periods ($T_{Ti}$), but they do not necessarily occupy the entire $T_{Ti}$ length. Rather, they may occupy a sub-interval t of the $T_{Ti}$ duration, i.e ($T_B<=T_{Ti}$). In other embodiments, the duration $T_{Ti}$ of each TX beam may correspond to the duration of each SSB being transmitted.

During each receiver sweep (e.g., RX Sweep 1), the user equipment is configured to compute a composite RSSI metric value over a set of samples equaling the size of the SSB window in time. To this end the user equipment may measure or calculate k samples of a specified RSSI metric value from each receive beam within the receive sweep. For example, a first RSSI metric value is measured during the first receive RX beam (RX1), a second RSS metric value is measured during the second receive RX beam (RX2), and so on until the Mth RSSI metric value is measured during the Mth receive RX beam (RXM). To account for possible misalignment between the timing of a receiver sweep and the SSB, the RSSI metric value (or, any similar metric, based on say power or energy, calculated from the pertinent samples) calculated at an RX beam of a first receive sweep may be summed (or, combined using any general aggregation function) with the RSSI value (or, any similar metric calculated from the pertinent samples) calculated at the same RX beam of the next receiver sweep, thereby generating a composite RSSI metric value for each RX beam to improve the probability that the appearance of an SSB within a RX beam is completely captured by the metric.

As part of the first stage computation, the signal processing unit(s) 213 may further be configured to detect the frequency of any detected SSB signals based on the composite RSSI metric values by using any desired processing techniques to compute an FFT over the overlapped batch of samples and then sweep a specified correlator waveform across the SSB frequency raster (e.g., the specific frequency bands in which the SSBs are expected) to detect correlator peaks exceeding a minimum threshold value, thereby identifying the presence of an SSB at the raster frequency location. If non-SSB downlink signals are scheduled in other candidate locations on the same RX beam, these will also be detected by the correlator sweep process, but they may not produce a positive detection of a cell presence during the cell search processing since they do not exceed the minimum threshold value.

As described more fully hereinbelow, the signal processing unit(s)[212] may also be configured to perform a second stage computation to identify the best RX beam by using any desired processing techniques (e.g., scalar or vector processing) to identify the maximum RSSI value for each RX beam over the entirety of one or more SSB bursts period. For example, at the end of each SSB burst period, the vector signal processing unit(s) 212 may generate a vector $r_M$ of M metric values from the calculated RSSI values measured during each receive RX beam, identify a maximum among the M metrics which exceeds a predefined threshold, and then select the receive RX beam corresponding to the identified maximum metric value as the "best" or optimal RX beam. In other embodiments, the best top N candidates are chosen that correspond to the best N Rx beams so that the best N Rx beams are identified in the second stage computation.

Generally speaking, the first and second stage computations can be based on one or more SSB bursts by making continuous circular round robin M RX beam sweeps and B frequency band sweeps across one or more SSB burst periods. For example, multiple SSB bursts could be used by processing the samples with the RX beam sweep until the computed RSSI metric meets a specified threshold. In addition or in the alternative, RSSI values could be computed over multiple SSB bursts in order to compute average RSSI values across successive burst periods to improve signal-to-noise ratio performance. In yet other embodiments, M/2 RX beam sweeps could be conducted in a first SSB burst (or 1 thru B/2 burst periods), with the remaining M/2 RX beam sweeps being conducted in the second SSB burst (or burst periods B/2 to B). In general, M/P RX beam sweeps can be conducted in a SSB burst (where M/P>1 is an integer for some integer value P) in such a way so that all M beams are sweeps over R≥P bursts. By processing more than one RX beam in one SSB period, first stage latency is reduced. Similarly, by simultaneously sweeping across M RX beams and B frequency bands, within one or more SSB periods, and by using the RSSI values thus obtained, the best beam and the best frequency band can be jointly identified.

To perform time and frequency synchronization with the base station 201, a third stage computation is performed by the user equipment 210 for each selected SSB frequency and RX beam identified in the first and second stage computations. For example, the digital signal processing unit 213 may configure the receive beamformer unit 212 with beamforming weights to lock onto the "best" or optimum RX beam that is selected in the second stage computation so that the remaining cell search process (e.g., PSS/SSS detection and BCH decoding) is performed by filtering the samples with a filter for the detected SSB frequency band. In embodiments where multiple receive RX beams are identified in the second stage (e.g., RX beams having computed RSSI values exceeding a minimum threshold), each or some of the multiple receive RX beams and their corresponding SSB frequency bands may be used for cell search. For example, each of the multiple RX beams may be sequentially used, strongest one first, to perform the cell search using the corresponding SSB frequency bands in the third stage until the cell search goals are achieved. In another example, the cell search may be performed with a weighted linear combination of some of the identified RX beams where the weighting could be based on the received signal strength metric. With the receiver antenna array 211 locked onto the optimal receive RX beam (RX OPT), the user equipment 210 then performs a correlation-based cell search during a second SSB burst from the base station 201. In particular, the user equipment 210 is configured to monitor, during a listening interval for the selected receive beam (Ts), each of transmit TX beams from the base station 201 during a second SSB burst. In this second stage, the duration of the listening interval ($T_{RS}$) corresponds roughly to the duration of a second SSB burst period ($T_{SSBPERIOD}$). Again, it will be appreciated that the above-described procedure can be generalized to enable the second stage to span more than one SSB burst periods. In other embodiments, the cell search procedure is repeated across several SSB bursts where the cell search is conducted with each of the different best Rx beams identified in the first stage.

While selected embodiments of the SSB frequency raster search methodology described herein may require that the UE's transceiver is capable of scanning the total SSB frequency bandwidth in order to detect transmitted SSBs, there may be situations where only a fraction of the total SSB frequency bandwidth is to be searched, such as when UE transceivers can only search or scan a fraction of the total SSB frequency bandwidth. In such situations, selected embodiments of the present disclosure allow the fall frequency bandwidth search space to be divided into B sub-bands which can be scanned to cover the total SSB frequency bandwidth using the first hierarchical approach. To provide additional details for an improved understanding of such embodiments, reference is now made to FIG. 2B which depicts a timing diagram 240 for a first hierarchical approach for sweeping one or more frequency sub-bands within each swept receiver beam to provide a fast and robust cell search synchronization procedure. In the first hierarchical approach, the UE's antenna array is configured to listen to each SSB transmission by continuously sweeping M receive beams 244 over a listening period having a total duration T 241 such that the UE's transceiver is tuned to sweep across B frequency sub-bands (e.g., 243) for each receive beam listening period (e.g., 242A). In selected embodiments, the duration or period T 241 for sweeping M receive beams is equal to the duration of each SSB that is transmitted. However, in other embodiments, the duration or period T 241 for sweeping M receive beams is equal to a predetermined fraction (e.g., ¼) or integer multiple (e.g., 4) or integer multiple of the duration of a single transmitted SSB.

Figure 2B:
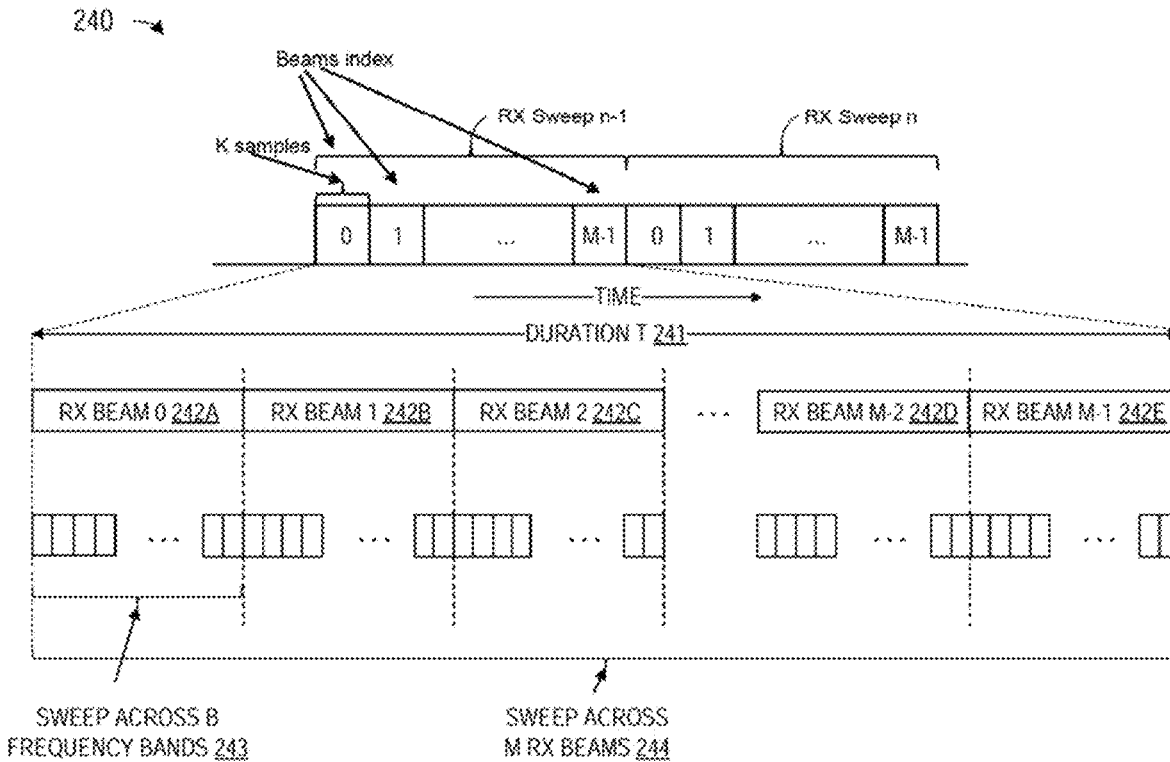
FIG. 2B depicts a first hierarchical approach for sweeping one or more frequency sub-bands within each swept receiver beam to provide a fast and robust cell search synchronization procedure in accordance with selected embodiments of the present disclosure.

As shown in FIG. 2B, the first hierarchical approach configures a first receiver beam sweep (e.g., RX sweep n−1) to sequentially apply M receive beams 244 to the receiver antenna array, starting with a first receive beam 242A (e.g., RX Beam 0), a second receive beam 242B (e.g., RX Beam 1), and so on until the Mth receive beam 242E (e.g., RX Beam M−1) is applied. At each receiver beam configuration of the UE receiver antenna array (e.g., beam index 0), the UE captures k samples which are used to sweep across B frequency sub-bands 243 by changing the frequency tuner of the transceiver rapidly and continuously so as to periodically sweep through the B sub-bands within the time duration that is spent listening on each RX beam. This creates the first hierarchical sweep of RX beam and frequency where the UE's transceiver is tuned to sweep across B frequency sub-bands for each receive beam listening period. The frequency band sweep rate is B times as fast as the RX beam sweep rate, where B is an integer ≥1. For example, if the UE transceiver can only scan 100 MHz of a total frequency raster of 400 MHz, then B=4, in which case the first hierarchical approach sweeps across 4 frequency sub-beams of 100 MHz each while the UE's receive antenna array is configured with the first receive beam (e.g., RX Beam 0), the second receive beam (e.g., RX Beam 1), and so on.

In selected embodiments of the first stage operation, the hierarchy can be reversed by configuring the UE's transceiver to sweep across one or more frequency sub-bands 254 and to also sweep across M receiver beams (e.g., 253) while tuned to each of frequency sub-band (e.g. 252A). To provide additional details for an improved understanding of such embodiments, reference is now made to FIG. 2C which depicts a timing diagram 250 for a second hierarchical approach for sweeping the receiver beams within one or more frequency sub-bands to provide a fast and robust cell search synchronization procedure. In the second hierarchical approach, the UE array is configured to listen for SSB transmissions by tuning the transceiver to sweep across one or more (B) frequency sub-bands 254 over a listening period having a total duration T 251 such that the UE's antenna array is configured to sweep M receiver beams (e.g., 253) during each frequency sub-band (e.g., 252A). In selected embodiments, the duration or period T 251 for tuning across B frequency sub-bands is equal to the duration of each SSB that is transmitted. However, in other embodiments, the duration or period T 251 for tuning across B frequency sub-bands is equal to a predetermined fraction (e.g., ½) or integer multiple (e.g., 2) of the duration of a single transmitted SSB.

Figure 2C:
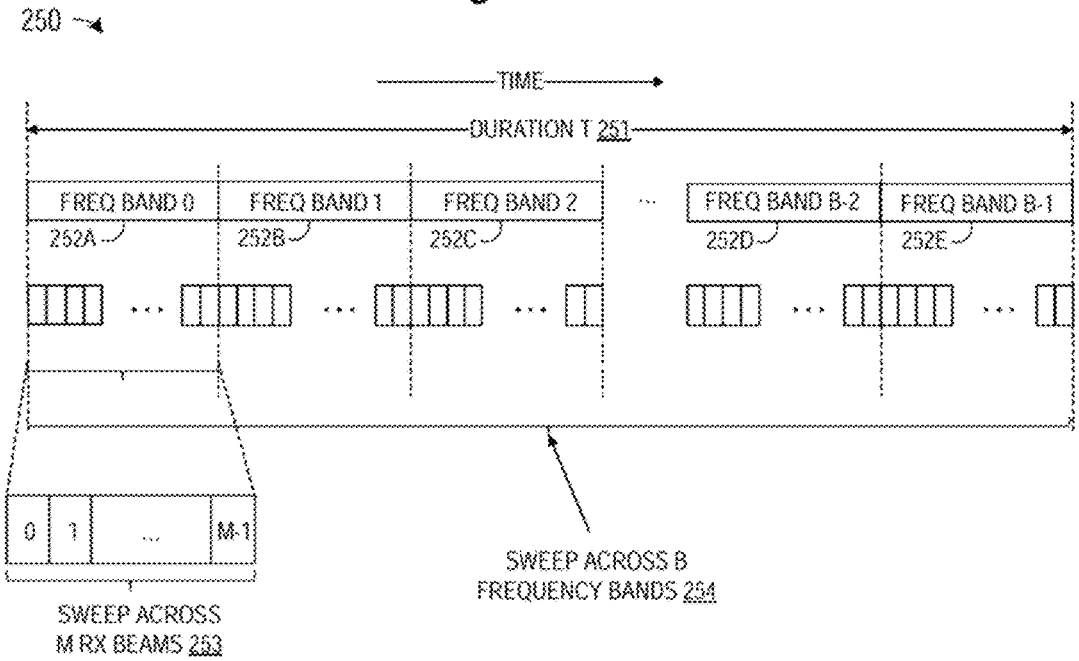
FIG. 2C depicts a second hierarchical approach for sweeping the receiver beams within one or more frequency sub-bands to provide a fast and robust cell search synchronization procedure in accordance with selected embodiments of the present disclosure.

As shown in FIG. 2C, the first hierarchical approach configures a first receiver beam sweep (e.g., RX sweep n–1) to sequentially tune the transceiver to B frequency sub-bands, starting with a first frequency sub-band (e.g., Freq. Band 0), a second frequency sub-band (e.g., Freq. Band 1), and so on until the Bth frequency sub-band (e.g., Freq. Band B-1) is reached. At each frequency sub-band (e.g., Freq. Band 0), the UE captures k samples which are used to sweep across M receive bands by sequentially applying the M receive beams rapidly and continuously so as to periodically sweep through the M receive bands within the time duration that is spent listening on each frequency sub-band. This creates the second hierarchical sweep of RX frequency and beam where the UE's transceiver is tuned to sweep across M receive beams for each frequency sub-band listening period. For example, if the UE transceiver can only scan 100 MHz of a total frequency raster of 400 MHz, then B=4, in which case the second hierarchical approach sweeps across M receive beams while the UE's receive antenna array is configured with a first frequency sub-beam of 0-100 MHz, with a second frequency sub-beam of 101-200 MHz, and so on.

Figure 3:
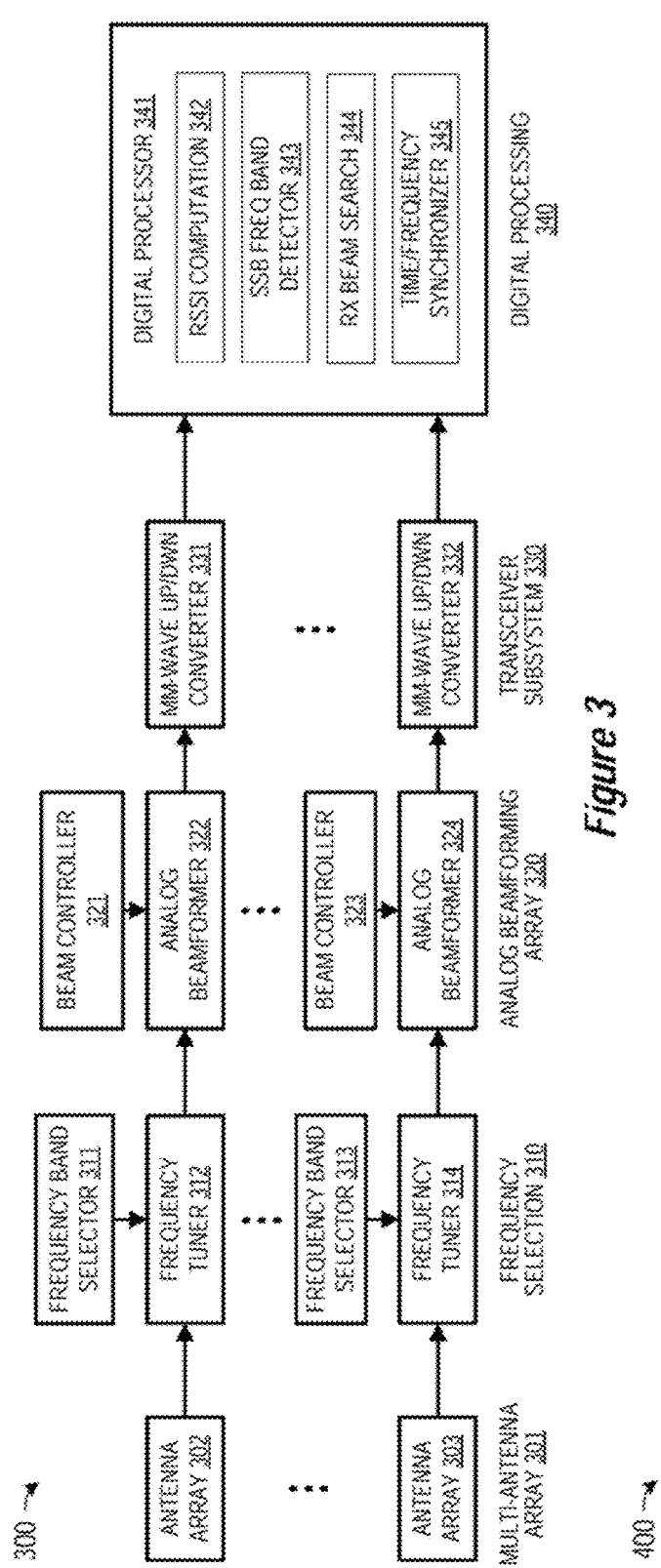
FIG. 3 is a system block diagram illustration of a user equipment having a reconfigurable multi-antenna millimeter-wave subsystem with analog beamforming for performing cell search in accordance with selected embodiments of the present disclosure.

To provide additional details for an improved understanding of selected embodiments of the present disclosure, reference is now made to FIG. 3 which is a simplified block diagram illustration of a user equipment system 300 having one or more reconfigurable multi-antenna array subsystems 301 with corresponding frequency band selection subsystems 310, analog beamforming array subsystems 320 connected over one or more transceiver subsystems 330 to a digital processing subsystem 340 which is configured to perform the multi-stage cell search in accordance with selected embodiments of the present disclosure. To this end, each multi-antenna array subsystem 301 includes a plurality of configurable antenna array elements 302-303, where each may include a reconfigurable band-pass filter within the feeding line of an antenna element (e.g., filtenna). When receiving or transmitting signals over the multi-antenna array subsystem 301, one or more frequency band selection subsystems 310 is connected and configured to select one of B frequency sub-bands, such as by using frequency tuner circuits 312, 314 which are swept under control of a corresponding frequency band selector 311, 313. In addition, the analog beamformers 322, 324 may apply analog beamforming weights under control of the beam controller units 321, 323. The output(s) from the analog beamformers 322, 324 may be connected to a millimeter-wave up/down converter 331, 332 in transceiver subsystem 330 that provides signal processing and conversion to/from baseband via additional filtering stages, up/down conversion stages, ADC/DAC etc. The digital output from the transceiver subsystem 330 is streamed to the digital processor subsystem 341 that performs digital processing 340, such as the baseband processing commensurate with the physical layer processing requirements of the applicable communication protocol. The digital processor 341 can also perform processing commensurate with the requirements for layers 2 and higher as stipulated by the communication standard. It should be appreciated that the digital processor block(s) 341 can be implemented via one or more DSP cores, custom ASICs, or, one or more generic vector processors.

Under control of the digital processing subsystem 340, the analog beamformers 322, 324 are configured to apply beamforming weights so that the analog multi-antenna array subsystem 310 sweeps through M receive beams continuously in a circular round robin fashion throughout the duration of an SSB burst period. During each receiver beam sweep, the digital processor 341 may use an RSSI computation module 342 that is configured to measure K samples for each receive RX beam over a defined receive sampling duration $T_R = T_{R1} + T_{R2} + \ldots T_{RM}$, where the sampling duration $T_R$ that matches the length of the SSB block that is transmitted on each transmit TX beam within each SSB period $T_{Ti}$. Based on measurements over a predetermined time duration on one or more of the consecutive K sample sub-blocks for each receiver RX block, the RSSI computation module 342 compute a composite RSSI metric value a defined sample set to detect possible SSB signals in the domain. And to detect a frequency band for detected SSB signals, the digital processor 341 may use an SSB frequency band detector module 343 that is configured to identify a frequency band for the detected SSB signals which are transformed into the frequency domain and then swept with a correlator waveform over the SSB frequency raster where SSBs are expected. The digital processor 341 may also use an RX beam search module 344 that is configured to identify the optimal RX beam for communicating with the base station during initial access, such as by determining which receive RX beam recorded the highest power when scanning for the presence of an SSB block. With the SSB frequency and optimal RX beam identified, the digital processor 341 may complete the synch-based acquisition of the best SSB for the initial access by using the time frequency synchronizer module 345 which configures the multi-antenna array subsystem 310 with beamforming weights to lock onto the selected receive RX beam and then uses the identified SSB frequency to perform a synch-based acquisition of the best SSB for the initial access. To address potential misalignment between the receiver beam sweep and an SSB transmitted in a given transmit TX beam, the digital processing subsystem 340 may use sample measurements from one or more consecutive RX beam sweeps to calculate the metric used to identify the strongest beam.

Figure 4:
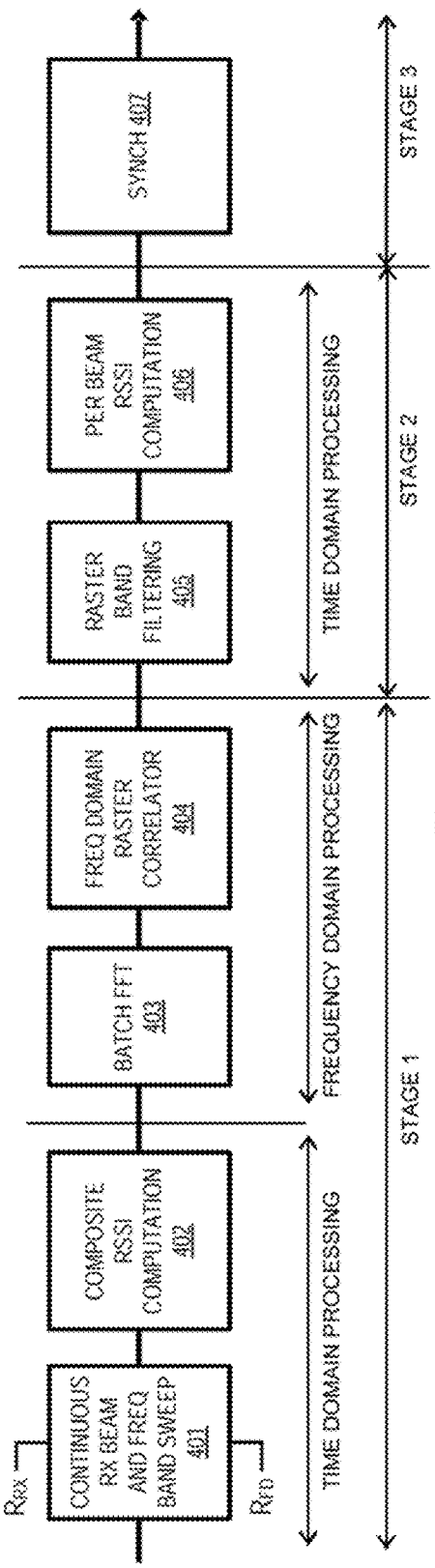
FIG. 4 is a block diagram illustration of a three-stage cell search procedure in accordance with selected embodiments of the present disclosure.

To provide additional details for an improved understanding of selected embodiments of the present disclosure, reference is now made to FIG. 4 which is a block diagram illustration of a three-stage cell search procedure 400 for making initial access between a base station transmitter and user equipment receiver to achieve maximum robustness (coverage) by enabling the use of RX beams with maximum selectivity, while achieving close to minimum acquisition times. In a disclosed first stage (Stage 1), the frequency band of a detected SSB is detected from composite RSSI metric values collected from continuously sweeping the RX beams using a combination of time domain and frequency domain processing. In a disclosed second stage (Stage 2), the optimal RX beam detected from per-beam RSS metric values collected from continuously sweeping the RX beams using time domain processing to identify the RX beam having the largest RSSI metric value. In a disclosed third stage (Stage 3), time and frequency synchronization is performed by using the optimum RX beam and associated SSB frequency to identify the strongest TX beam.

In Stage 1, RSSI values for detected SSBs are used to detect the SSB frequency values by searching the specified SSB frequency raster. In a first step 401, the user equipment sequentially sweeps its RX beams and frequency bands in a continuous, round robin manner under the control of one or more sweep rate control signals to generate a composite sample waveform for use in detecting the frequency band of a transmitted SSB and an optimal receive beam for the user equipment. In operation, the receive beam sweep function at step 401 may be controlled by a specified receive beam sweep rate $R_{RX}$ to sweep through the set of receive beams for the user equipment. In addition, the frequency domain sweep function at step 401 may be controlled by a specified frequency domain or frequency band sweep rate $R_{FD}$ to sweep through the entire range of the SSB frequency raster or the channel bandwidth. As will be appreciated, the first hierarchical approach for sweeping one or more frequency bands within each swept receiver beam will set the sweep rate control signals such that $R_{FD}=B*R_{RX}$, where B is the number of frequency bands. In addition, the second hierarchical approach for sweeping the receiver beams within one or more frequency bands will set the sweep rate control signals such that $R_{RX}=M*R_{FD}$, where M is the number of receive beams. And if there is only one frequency band (e.g., $R_{FD}=1$), then the UE transceiver is tuned to the entire range of the SSB frequency raster or the channel bandwidth at each receive beam search. Under control of the sweep rate control signals, the temporal duration of each sweep period (a single period covers all M beams) is aligned to the temporal duration of a SSB transmission. By continuously sweeping the user equipment's receive beams, a composite sample waveform is generated. In a second step 402, a composite RSSI metric is computed over every set of samples in the composite sample waveform, where the duration of the sample set equals the duration of the SSB window. If the composite RSSI values meets or exceeds a composite threshold (e.g., $RSSI \geq RSSI_{CTh}$), this indicates a possible SSB presence in the received composite sample waveform. In selected embodiments, the composite threshold $RSSI_{CTh}$ may be fine-tuned, depending on the automatic gain control tuning and noise power. In a third step 403, the temporal SSB signals are transformed into the frequency domain by computing an FFT over each batch of overlapped signals whenever an SSB presence is indicated as a result of step 402. In a fourth step 404, the SSB frequency raster is searched to find the SSB frequency sub-band, such as by sweeping a correlator waveform having a suitable waveform across the SSB frequency raster to identify correlation peaks above a predefined correlation threshold which indicate the presence of an SSB in that frequency slot in the raster. In selected embodiments, the correlation threshold may be fine-tuned, depending on the automatic gain control tuning and noise power. In yet another embodiment, the B frequency sub-bands during the first stage of operation can be chosen to be all the SSB candidate sub-bands in the raster so that the SSB frequency sub-band(s) can be identified via the first stage of operation itself.

In Stage 2, per-beam RSSI values for detected SSBs are used to detect the optimum RX beam(s). In a first step 405, the user equipment may perform raster band filtering in the time domain. For example, the filter step 405 may apply, for each correlator peak identified in Stage 1, a corresponding bandpass filter to filter (and optionally decimate) the signal, such as by using a bandpass filter having a bandwidth equal to the SSB bandwidth, or by mixing the signal and then applying a low pass filter. In a second step 406, a per-beam RSSI metric value is computed from the filtered signal for each swept RX beam. If the per-beam RSSI metric value meets or exceeds an RSSI beam threshold $RSSI_{BTh}$ (e.g., $RSSI \geq RSSI_{BTh}$), then the beam(s) with the highest RSSI metric value may be chosen as the optimal receive beam(s).

In Stage 3, the transmit and receive beams are synchronized in time and frequency. In a first step 407, the user equipment may perform, for each selected SSB band from Stage 1, the remaining cell search procedure—e.g., primary synchronization signal (PSS)/secondary synchronization signal (SSS) detection and Physical Broadcast Channel (PBCH) decoding—is performed to identify the strongest TX beam. For example, with the user equipment tuned to the chosen or optimal RX beam and corresponding SSB frequency beam, a cell search processing stage searches for synch patterns to perform time and frequency synchronization and to decode the PBCH on the strongest TX beam.

Figure 5:
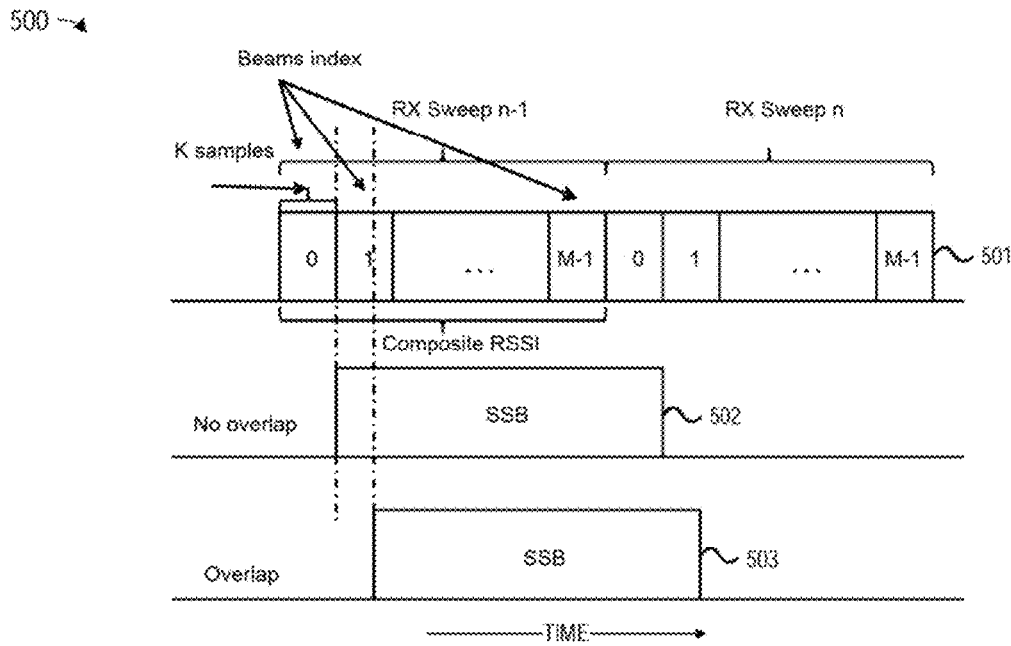
FIG. 5 is a timing diagram illustrating different receiver beam sweeping scenarios in accordance with selected embodiments of the present disclosure.

To provide additional details for an improved understanding of how to account for potential misalignment between a receiver beam sweep and an SSB transmitted in a given transmit TX beam, reference is now made to FIG. 5 which is a timing diagram 500 illustrating different beam sweep scenarios in accordance with selected embodiments of the present disclosure. As shown in the signal waveform 501, the user equipment continually listens for an SSB transmission on M receive RX beams (M≥1) by configuring the multi-antenna array with beamforming weights to take K sample measurements at each receive RX beam having a corresponding receive beam index (0, 1 . . . M−1). Once a first receiver beam sweep (RX Sweep n-1) is completed, the multi-antenna array is reconfigured to continue taking samples in a time-multiplexed round-robin manner by immediately performing a second receiver beam sweep (RX Sweep n), and so on. By setting the duration of one round robin sampling period (the time to cycle through all M beams) to match the duration of an SSB transmission, then each round robin sampling period collects "M" sets of samples, each corresponding to one of the RX beam directions. In this round-robin sampling mode, an SSB transmission from an SSB burst will be "visible" in the correct or pth RX beam (where p is one of 1, 2, . . . , M). However, depending on the alignment of the exact start of the SSB relative to a round robin period, the chunk of the SSB that is visible through "p" may either be entirely contained within the $p^{th}$ bin of a single round robin period (non-overlapping case), or, may span the $p^{th}$ bins of 2 contiguous round robin periods (overlapping case). In the non-overlapping case, the start of the SSB 502 aligns exactly with one of the sampling periods (e.g., beam index 1). However, in the overlap case, the start of the SSB 503 is not aligned with the start of a sampling period, and instead starts partway through a sampling period (e.g., during beam index 1). This property arises as a consequence of selecting the round robin period to match the SSB duration, as illustrated in FIG. 5.

In order to cover all possible alignment scenarios, sample measurements from the receiver beam sweep are collected for each of M bins across two consecutive round robin periods (e.g., RX Sweep n−1 and RX Sweep n). As a further optimization, the sample measurements from receiver RX block bins in two sampling periods are not simply added together, but are instead processed to choose a half subset of continuous samples within the two period window that gives a maximum power measurement. This helps improve the SNR of the sample measurements by not counting the "all noise, no signal" samples within the two period window.

Figure 6:
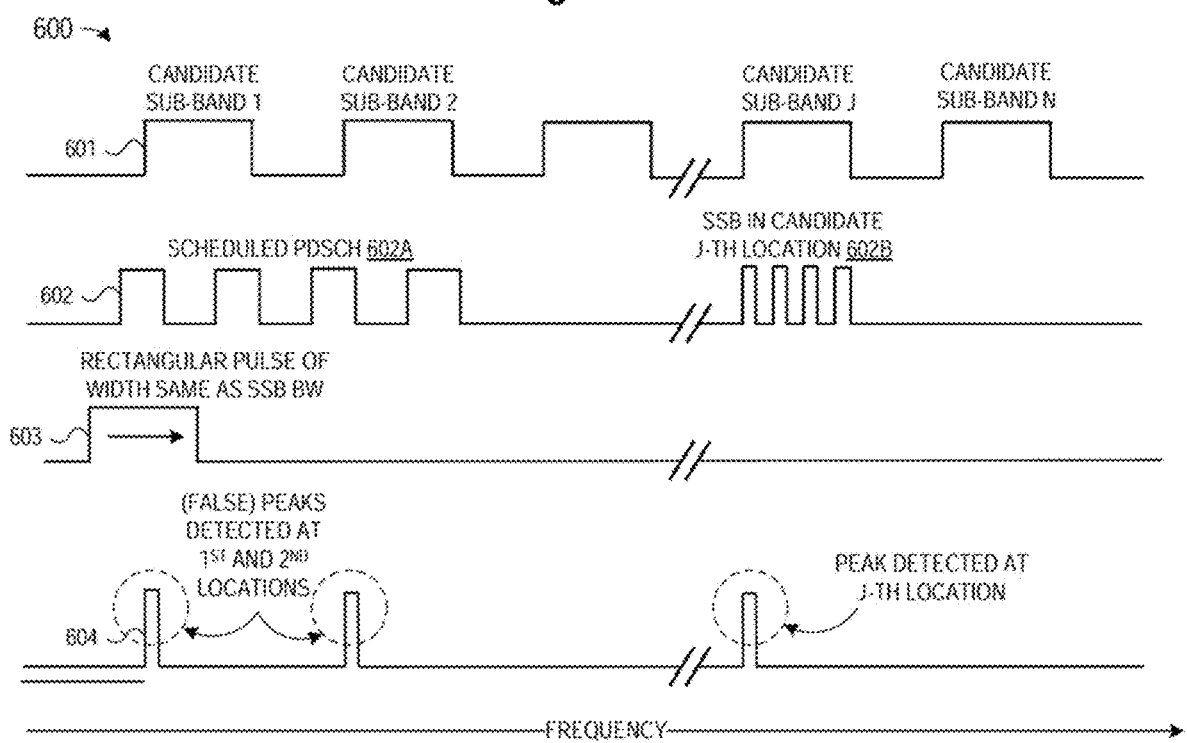
FIG. 6 is a frequency diagram illustrating a first stage use of a raster correlator to perform a frequency domain SSB raster search to detect peak correlations in accordance with selected embodiments of the present disclosure.

Referring now to FIG. 6, there is depicted an example frequency diagram 600 in which waveforms 601-604 illustrate the operation of the first stage computation in which a raster correlator waveform is used to perform a frequency domain SSB raster search to detect peak correlations in accordance with selected embodiments of the present disclosure. The first waveform 601 shows the frequency sub-band locations in the frequency raster domain where the SSB candidate sub-bands 1-N can be transmitted. For example, the 5G-NR standard specifies a use case scenario for a channel bandwidth of 400 MHz wherein each SSB candidate sub-band has a bandwidth of 28.8 MHz with a band separation spacing of 25.92 MHz.

As will be appreciated, sweeping of the receiver beams will produce discontinuities in the sampled waveform that can show up as distortions in the frequency domain. This is shown in the second waveform 602 where a downlink/transmitted SSB signal 602B is detected in the jth frequency sub-band location, but there are also non-SSB DL signals, such as scheduled PDSCH signals 602A, that are scheduled in other candidate frequency sub-band locations (e.g., candidate sub-bands 1-2) on the same RX beam.

To differentiate the detected SSB 602B and non-SSB DL signals 602A, a correlation waveform scheme may be applied for frequency domain detection of the actual SSB waveforms 602B. This is illustrated with the third waveform 603 which shows that a correlator waveform 603 may be swept across the frequency domain on the SSB raster or the entire channel bandwidth. By designing the shape and pulse width of correlator waveform 603 as a rectangular window with a width equal to that of an SSB, the cell search processing can be performed on the locations of the candidate sub-bands 1, 2 and j so that spurious DL signals can be prevented from producing a positive detection by specifying a predefined correlator threshold so that any detected correlation peaks must meet or exceed the predefined correlator threshold in order to indicate the presence of a SSB in that raster location. As will be appreciated, the probability for detecting an SSB waveform with a correlation waveform 603 can be optimized by careful section of thresholds and correlator waveforms—this makes it a viable scheme for frequency domain detection even with RX beam sweeping.

Figure 7:
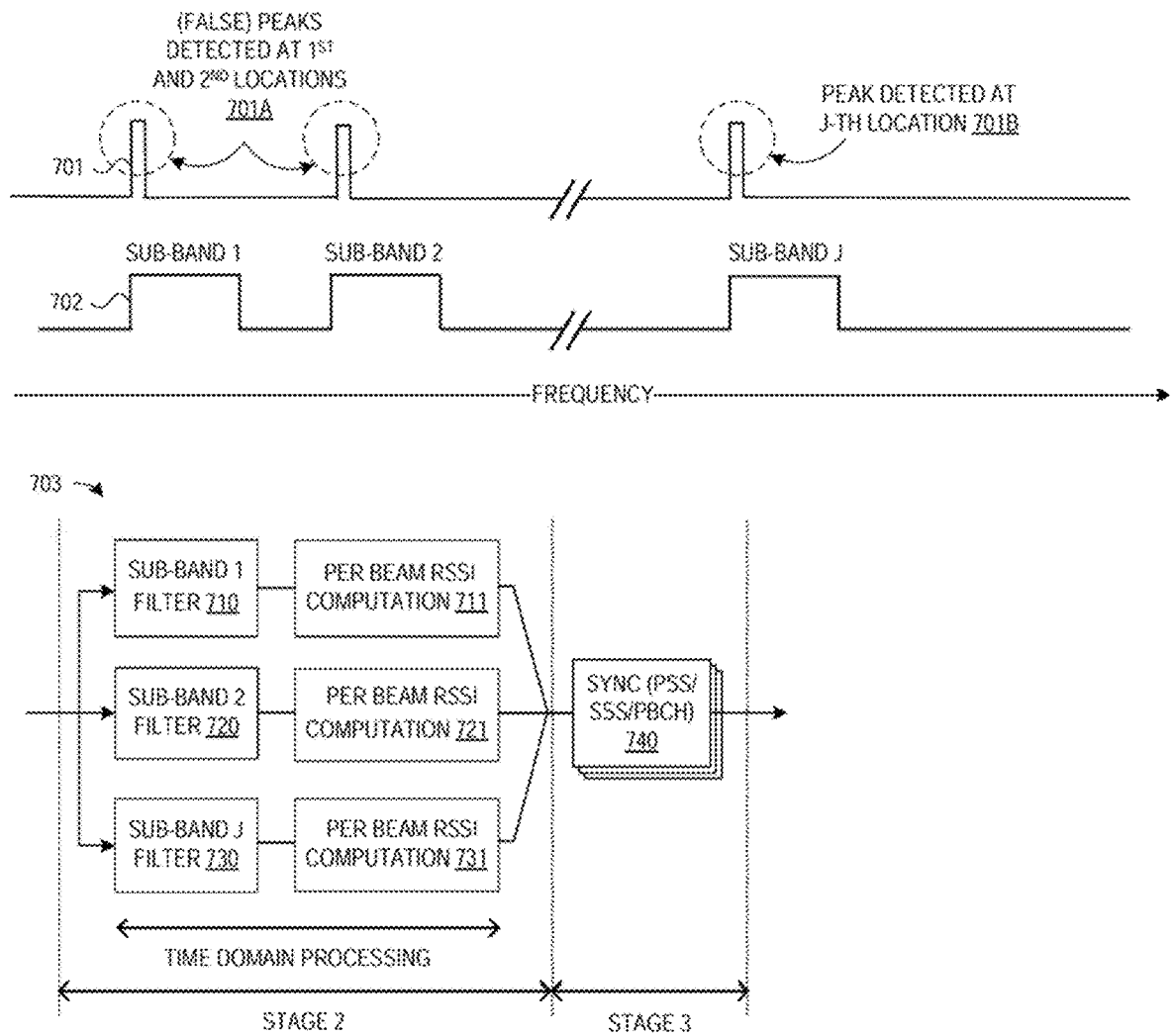
FIG. 7 is a timing diagram illustrating the use of signal band filtering and per-beam RSSI calculations in a second stage to identify the optimum receive beam in accordance with selected embodiments of the present disclosure.
Figure 7:
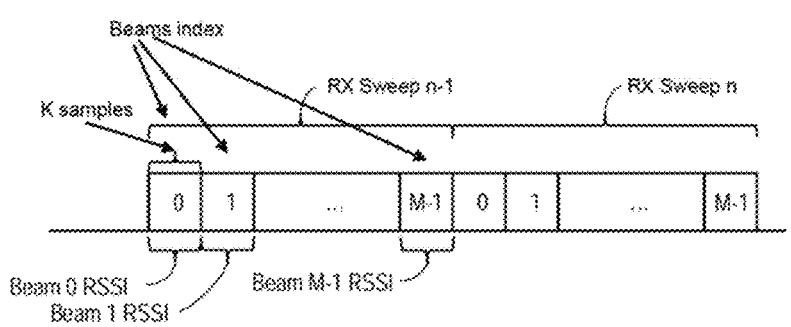

Even with a correlator threshold applied, the applied correlator waveform can still result in identification of one or more false peaks, as shown in the fourth waveform 604 where a correct peak is detected at the jth frequency sub-band location along with false peaks detected at the first and second SSB frequency sub-band locations. To prevent false peak indications in the SSB frequency sub-band locations from producing positive SSB detections, additional receiver signal processing may be applied at a second stage search by performing raster band filtering to compute per-beam RSSI computations for selecting the optimum receiver beam. An example sequence for receiver signal processing is shown in FIG. 7 which depicts example signal waveforms 701-703 to illustrate the use of time domain signal band filtering and per-beam RSSI calculations in the second stage (Stage 2) to identify the optimum receive beam in accordance with selected embodiments of the present disclosure. The first waveform 701 shows the detected correlation peaks in the frequency domain, including a first "true" peak 701B (where the downlink/transmitted SSB signal is detected in the jth frequency sub-band location) and one or more additional "false" peaks 701A (where non-SSB DL signals are detected). For each detected correlation peak 701A, 701B, the time domain signal is filtered at its corresponding frequency band, as shown in the second waveform 702 which depicts the detected frequency sub-bands 1, 2, and j corresponding to the detected correlation peaks 701B and 701A. Finally, the third waveform 703 shows the time domain processing wherein sub-band filters 710, 720, 730 for detected frequency sub-bands 1, 2, and j are simultaneously applied in parallel to perform raster band filtering on the detected SSB bands from Stage 1. In particular, for the first false peak 701A detected at Stage 1, the corresponding SSB sub-band filter 710 (e.g., Band 1 Filter) is applied to filter the time domain signal at its corresponding sub-band, and the filtered result is used to compute the per-beam RSSI metric values 711 for all of the M swept RX beams using K filtered samples each. Similarly for the second false peak 701A detected at Stage 1, the corresponding SSB sub-band filter 720 (e.g., Band 2 Filter) is applied to filter the time domain signal at its corresponding sub-band, and the filtered result is used to compute the per-beam RSSI metric values 721 for all of the M swept RX beams using K filtered samples each. And for the true peak 701B detected at Stage 1, the corresponding SSB sub-band filter 730 (e.g., Band J Filter) is applied to filter the time domain signal at its corresponding sub-band, with the filtered result being used to compute the per-beam RSSI metric values 731 for all of the M swept RX beams using K filtered samples each. After per-band filtering and per-beam RSSI computation, a sync computation 740 (Stage 3) is run on each branch that survives (i.e., has at least one per-beam RSSI above a certain threshold) to synchronize the transmit and receive beams in time and frequency. In the sync computation 740, the cell search procedure may be concluded by performing PSS/SSS detection and PBCH decoding to identify the strongest TX beam.

Figure 7A:
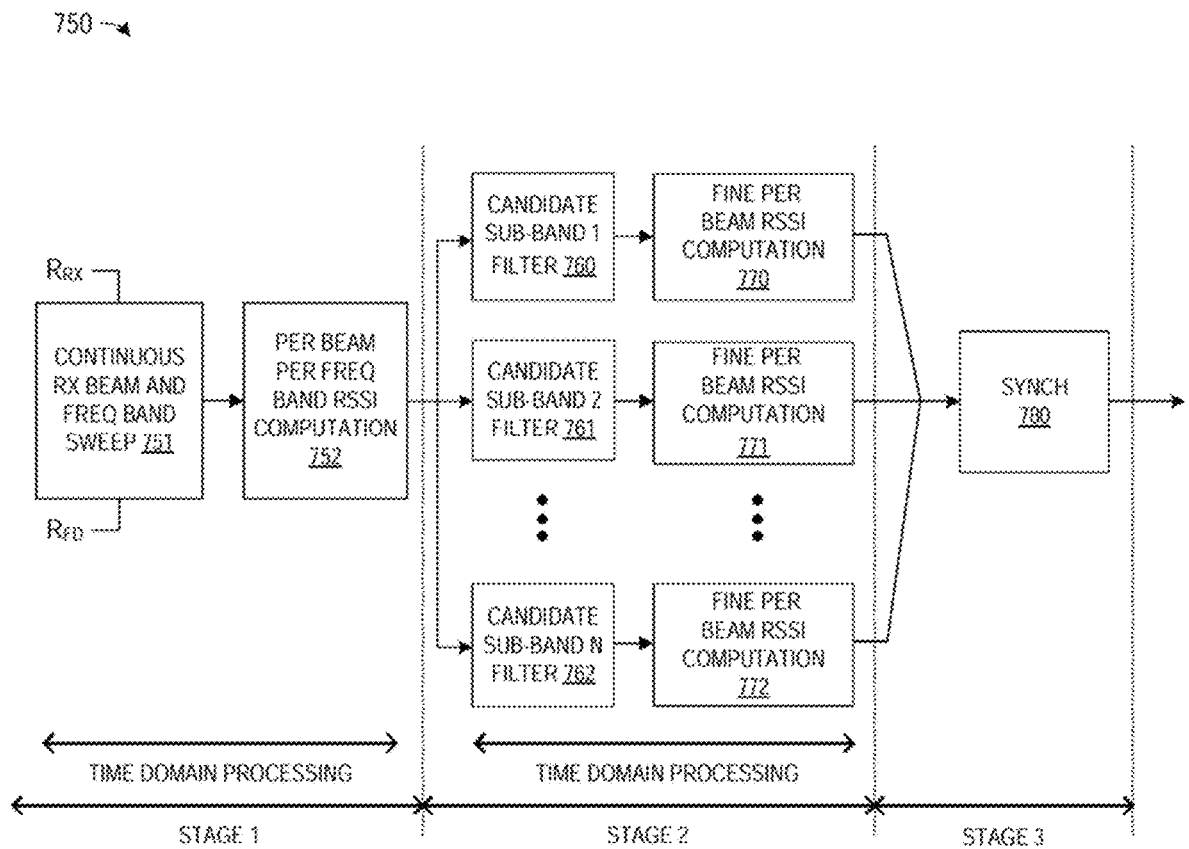
FIG. 7A is a block diagram illustration of a multi-stage cell search procedure for making initial access between a base station transmitter and user equipment receiver in accordance with selected embodiments of the present disclosure.

To provide additional details for an improved understanding of selected embodiments of the present disclosure, reference is now made to FIG. 7a which is a block diagram illustration of a multi-stage cell search procedure 750 for making initial access between a base station transmitter and user equipment receiver. In a disclosed first stage (Stage 1), the frequency band of a detected SSB is detected by continuously sweeping the RX beams and frequency bands and collecting per-beam per-frequency band RSSI metric values using time domain processing to find if there is sufficient energy detected in any of the RX beams during the sweep which would indicate a signal of interest present on that beam. In a disclosed second stage (Stage 2), the Stage 1 signal is filtered on each of the N sub-bands of the SSB frequency raster and per-beam RSSI metric values are computed to detect which sub-band and Rx beam has energy above a specified minimum threshold, thereby identifying surviving branches. In a disclosed third stage (Stage 3), time and frequency synchronization is performed on each surviving branch from Stage 2 by using the optimum RX beam and associated SSB frequency to identify the strongest TX beam.

In Stage 1, the user equipment sequentially sweeps its RX beams in a continuous, round robin manner in response to one or more sweep rate control signals at step 751. In particular, the receive beam sweep function at step 751 may be controlled by a specified receive beam sweep rate $R_{RX}$ and the frequency domain sweep function may be controlled by a specified frequency domain or frequency band sweep rate $R_{FD}$. The period for sweeping all M RX beams equals at least the temporal duration of a single SSB transmission, so that each SSB can be swept by all M RX beams. In a second step 752, an RSSI metric is computed over every K samples for each receive beam and frequency band. If the per-beam, per-frequency band RSSI metric value meets or exceeds a first RSSI threshold (e.g., $RSSI \geq RSSI_{NBTh}$), then a possible SSB presence is indicated. In selected embodiments, the first RSSI threshold $RSSI_{NBTh}$ may be fine-tuned.

In Stage 2, per-beam, per-frequency band RSSI values for detected SSBs are used to detect the SSB frequency raster and optimum RX beam(s). In a first step 760-762, the user equipment may perform candidate frequency sub-band filtering in the time domain. In particular, an SSB presence is indicated from Stage 1, then the signal is filtered with a bank of filters 760-762, each filter corresponding to a different SSB band or frequency sub-band in the SSB raster. For example, the candidate sub-band filters 760-762 for each frequency sub-band 1-N are applied to each signal where an SSB presence is indicated, and the resulting filtered signals are used, respectively, to compute fine per-beam RSSI metric values at steps 770-772 for each swept RX beam. In steps 770-772, each fine per-beam RSSI metric value is computed from the filtered signal for each swept RX beam and then compared to a second RSSI beam threshold $RSSI_{BTh}$ (e.g., $RSSI \geq RSSI_{BTh}$). At the end of Stage 2, if the per-beam RSSI for any beam is greater than the second RSSI beam threshold $RSSI_{BTh}$, then the band and its corresponding Rx beam is selected for Stage 3 processing.

In Stage 3, the transmit and receive beams are synchronized in time and frequency. In a synchronization step 780, the user equipment may perform, for each selected SSB band from Stage 2, the remaining cell search procedure—e.g., PSS/SSS detection and PBCH decoding—to identify the strongest TX beam based on the SSB frequency and optimal RX beam detected for that SSB band. For example, with the user equipment tuned to the chosen or optimal RX beam and corresponding SSB frequency band, a cell search processing stage searches for synch patterns to perform time and frequency synchronization and to decode the PBCH on the strongest TX beam.

Figure 8:
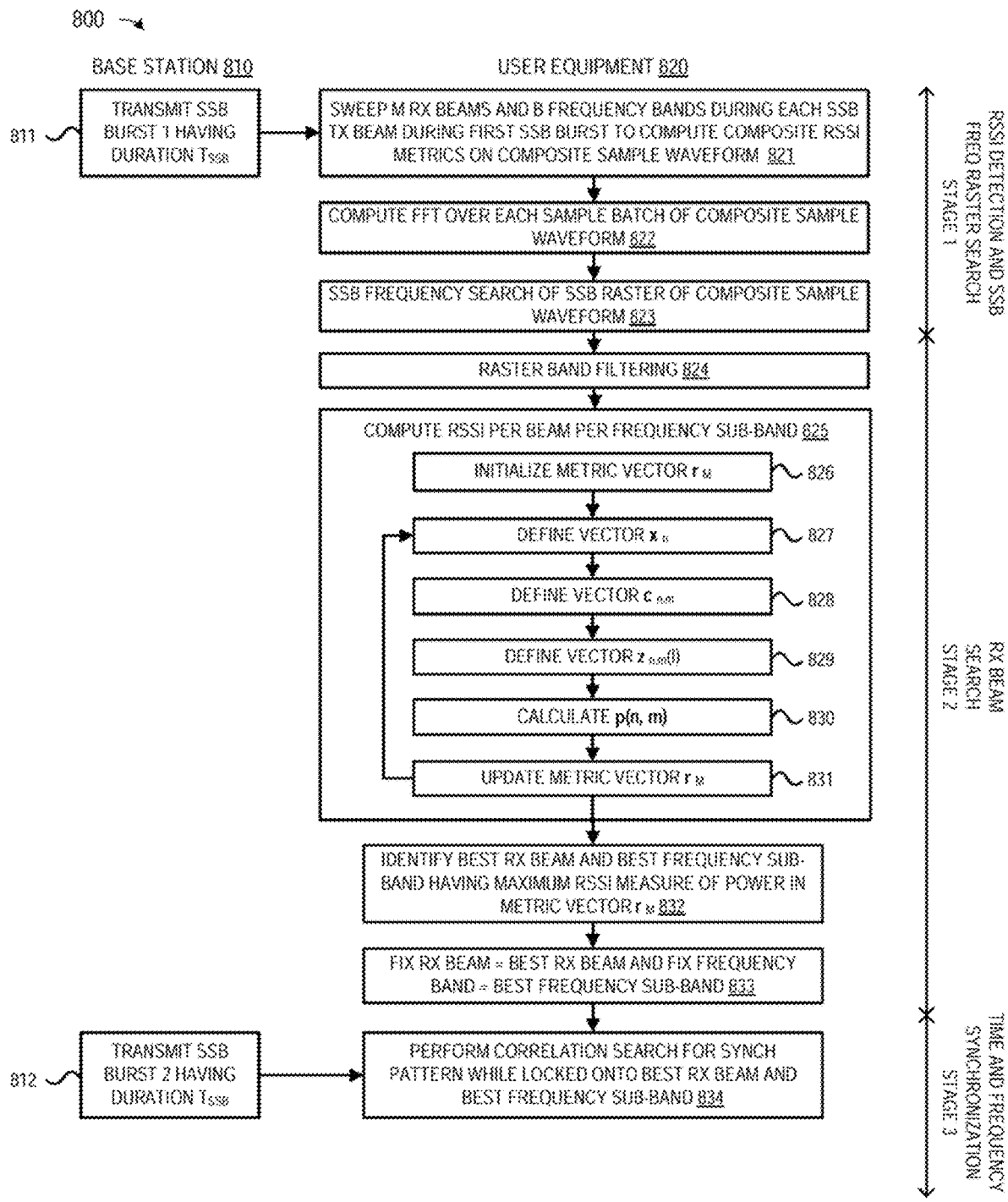
FIG. 8 is a simplified flow chart showing the logic for establishing mm-wave initial access between a base station and user equipment by performing a joint search of the SSB frequency raster and receive beam in accordance with selected embodiments of the present disclosure.

Referring now to FIG. 8, there is depicted an example flow diagram 800 of a method for establishing mm-wave initial access between a base station and user equipment by performing a joint search of the SSB frequency raster and receive beam in accordance with selected embodiments of the present disclosure. In the flow diagram 800, the method steps may be performed by programmable vector processing software, hardware and/or firmware having an vector processing hardware accelerator stages which are controlled by control logic (e.g., at the digital processing subsystem 340) to perform a first round of "quick" sweeps across "M" RX beams to compute composite received signal strength indicator (RSSI) metric values from continuous receiver beam sweep measurements for use in identifying an SSB frequency in a first stage computation, and for identifying an optimal receive RX beam in a second stage computation. The disclosed methods provide a compact, fast, and power efficient mechanism for achieving maximum robustness (coverage) and minimum acquisition times for establishing initial cell acquisition with next-generation mm-wave cellular communication systems, such as 5G-NR.

As a preliminary step in the first stage (Stage 1) computation, the base station 810 periodically transmits a Synchronization Signal Block (SSB) as part of a first SSB burst (step 811). As will be appreciated, each SSB occupies fixed time and frequency resources, and is transmitted in an SSB burst as independent SSB transmissions over a plurality of transmit TX beams from the base station 810 within a half-frame duration (e.g., 5 ms), where the half-frames carrying an SSB burst occur with a fixed periodicity (e.g., $T_{SSBPERIOD}$). In an example embodiment, an SSB burst from a base station 810 may include 64 independent SSB transmissions appearing on up to 64 independent transmit TX beams (corresponding to 64 different directions).

At step 821 in the first stage (Stage 1) computation, the user equipment 820 can listen for an SSB transmission on one or more receive RX beams by configuring its antenna array accordingly. In this example, the maximum number of beams the UE can support (highest resolution case) is denoted by M. Instead of listening on a receive RX beam for the entirety of the SSB burst, the user equipment 820 may continuously sweep M receive beams and B frequency bands during each SSB transmit TX beam of the first SSB burst to generate a composite sample waveform and to compute therefrom composite received signal strength indicator (RSSI) measurements over every sample set equaling the size of the SSB window in time. In selected embodiments of receive beam sweep operation 821, the UE may scan one or more receive beams and frequency band portions of the total SSB frequency raster, either by using a first hierarchical approach for tuning the UE to sweep across B frequency bands for each receive beam listening period, or by using a second hierarchical approach for configuring the UE to sweep across M receiver beams while tuned to each of one or more frequency bands. And while any suitable power or energy measurement technique may be used to compute the composite RSSI metric values, an example composite RSSI computation may begin by collecting $N_{SSB}$ samples during the receive beam sweep (step 821), where $N_{SSB}$ is defined as the number of samples spanned by each SSB at the operational sampling rate of the user equipment 820. As a result, the UE 820 continuously listens on "M" RX beams and "B" frequency bands in a round robin manner, with the UE 820 collecting K samples on each receive beam, where $K=N_{SSB}/M$. In a different embodiment, each round robin sweep may collect different number of samples (greater than or less than K) for each of the "M" RX beams and "B" frequency bands while maintaining the constant duration of the round robin period. If there is no composite RSSI metric that exceeds a minimum composite RSSI threshold ($RSSI_{CTh}$), this indicates there is no SSB transmission. However, if the composite RSSI metric exceeds the minimum composite RSSI threshold ($RSSI_{CTh}$), this indicates the presence of a possible SSB, and the process proceeds to step 822.

At step 822 in the first stage (Stage 1) computation, the user equipment 820 transforms possible SSB signal indications from step 821 into the frequency domain by computing FFT over overlapping batches of samples of the composite sample waveform, where the size of the overlapped sample batches corresponds to the FFT size.

Once the composite sampled waveform is transformed into the frequency domain, the UE 820 searches the specified SSB raster to identify the SSB frequency (step 823) to conclude the first stage (Stage 1) computation. Because RX beam sweeping produces discontinuities in the sampled waveform which appear as distortions in the frequency domain, the SSB frequency search process may employ correlation techniques to improve SSB detection, such as by sweeping the frequency domain on the SSB raster with a rectangular correlator waveform having a width equal to that of an SSB. Correlation peaks above a predefined threshold indicate the presence of a SSB in that raster location, thereby identifying the candidate SSB frequency.

For each SSB band detected in Stage 1, the user equipment 820 searches for the optimum receive beam in a second stage (Stage 2) computation. As a preliminary step in the second stage (Stage 2) computation, the UE 820 filters (and optionally decimates) the time domain signal at its corresponding SSB band with a raster band filtering process of the composite sample waveform (step 824). In selected embodiments, the UE 820 performs raster band filtering by filtering the composite sample waveform signal with the corresponding bandpass filter having a bandwidth that is equal to the SSB bandwidth. Alternatively, the composite sample waveform signal can be mixed and low pass filtered.

At step 825 in the second stage (Stage 2) computation, the user equipment 820 computes per-beam, per-SSB frequency sub-band RSSI metric values on the filtered signal for each swept RX beam. In selected embodiments, the processing at step 825 determines if the RSSI metric value exceeds a per-beam RSSI threshold ($RSSI_{BTh}$) for any beam(s), in which case the UE 820 identifies the RX beam as a candidate RX beam.

While any suitable RSSI computation algorithm may be used for step 825, the UE 820 may be configured to process the measurement samples at step 825 by first initializing a metric vector $r_M$ at step 826. In an example implementation, the processing at step 826 may be performed by an antenna signal processor which includes vector processor which initializes an M-element metric vector, $r_M = [0\ 0\ \ldots\ 0]^T$ with zero values.

At step 827, a first receive vector $x_n$ is generated by the digital processor by processing samples from the input sample stream. In an example implementation, the processing at step 827 defines the first receive vector as $x_n = [x(nN_{SSB}), x(nN_{SSB}+1), \ldots x(nN_{SSB}+N_{SSB}-1)]^T$, where $x(.)$ denotes the input sample stream and the first sample of each vector denotes the first sample of the nth round-robin receive RX beam sweep period.

At step 828, a second receive vector $c_{u,m}$ is generated by the digital processor by processing samples from the input sample stream. In an example implementation, the processing at step 828 defines the second receive vector as $c_{n,m} = [x(nN_{SSB}+mK), x(nN_{SSB}+mK+1), \ldots x(nN_{SSB}+mK+K-1)]^T$, where $c_{m,n}$ denotes the input samples received in round-robin period n for receive RX beam m.

At step 829, a third receive vector $z_{n,m}$ is generated by the digital processor by processing entries from the second receive vector $c_{n,m}$. In an example implementation, the processing at step 829 defines the third receive vector as $z_{n,m} = [c_{n-1,m}^T, c_{n,m}^T]^T$. If $z_i$ denotes the ith element of the third receive vector, then the processing at step 829 also generates a fourth receive vector may be defined as $z_{n,m}(l) = [z_l, z_{l+1}, \ldots z_{l+K-1}]$.

At step 830, a power or energy metric value p(n,m) is generated by the digital processor by processing values from the fourth receive vector $z_{n,m}(l)$. In an example implementation, the processing at step 830 defines the power metric value $p(n,m) = \max_{l \in \{0, 1, \ldots K\}} \|z_{n,m}(l)\|^2$ for each m=0, 1, ... M−1 for every round-robin period n.

At step 831, entries in the metric vector $r_M$ are updated with larger values from the power metric value p(n,m). In an example implementation, the processing at step 831 updates the metric vector $r_M(m) = p(n,m)$ if $p(m,n) > r_M(m)$, for each m=0, 1, ... M−1. And as indicated by the feedback line to step 827, the steps 827-831 are repeated for every round-robin loop that is applied for every transmit TX beam in the SSB burst by updating the loop count n.

The above described metric vector, $r_M(m)$, can be recomputed for each of the B candidate bands swept during the first stage and global maximum chosen to identify the best RX beam and best frequency band.

Once the full burst period is measured with steps 827-831, the processing proceeds to step 832 to identify the best receive RX beam and best frequency sub-band having the maximum RSSI measure of power embodied in the metric vector $r_M$. For example, the antenna signal processor may generate a set $S_m = \{0, 1, \ldots M-1 : r_M(m) > T\}$ that denotes the set of best receive RX beams for the current cell, where T is a pre-defined real threshold. Next, an optimal receive beam index, $m_o$, is chosen such that $m_o = \arg \max_{m \in S_m} p(n,m)$. If the set $S_m$ is empty and there is no maximum RSSI value, then steps 821-831 may be repeated.

With steps 821-831 being performed, a transmitted SSB on a transmit TX beam should be "visible" in the correct RX beam, say, p (p is one of 1, 2, ..., M). However, depending on the alignment of the exact start of the SSB relative to a round robin period when the receive beam sweep occurs, the chunk of the SSB that is visible through "p" may either be entirely contained within the $p^{th}$ bin of a single round robin period (non-overlapping case), or, may span the $p^{th}$ bins of two contiguous round robin periods (overlapping case). This property arises as a consequence of selecting the round robin period to match the SSB duration. To cover all the possible scenarios, RSSI values may be calculated from samples collected for each bin across one or more consecutive round robin periods by repeating steps 821-831 to accumulate RSSI measurements over multiple burst periods to look for peaks in "adjacent sweep blocks," thereby improving detection robustness under low SNR scenarios. And in selected embodiments, rather than considering all the samples for the bin from the two periods, a further optimization measures RSSI values for each bin by choosing a half subset of continuous samples within the two period windows that gives a maximum power measurement. This helps improve the SNR of our RSSI estimation by not counting the "all noise, no signal" samples within the two period window.

At step 832, the receive RX beam and SSB frequency sub-band having the largest RSSI measure are identified as the "best" or optimal RX beam and frequency band for receiving the SSB. At step 833, the digital processor may then fix the multi-antenna array to the best receive RX beam and best frequency sub-band corresponding to the optimal RX beam index $m_o$. Subsequently, the base station 810 transmits a second SSB burst having an SSB burst duration $T_{SSB}$ at step 812, and then the user equipment 820 performs a correlation-based cell search for the synch pattern at step 834 while locked onto the best receive RX beam and best frequency sub-band.

Figure 9:
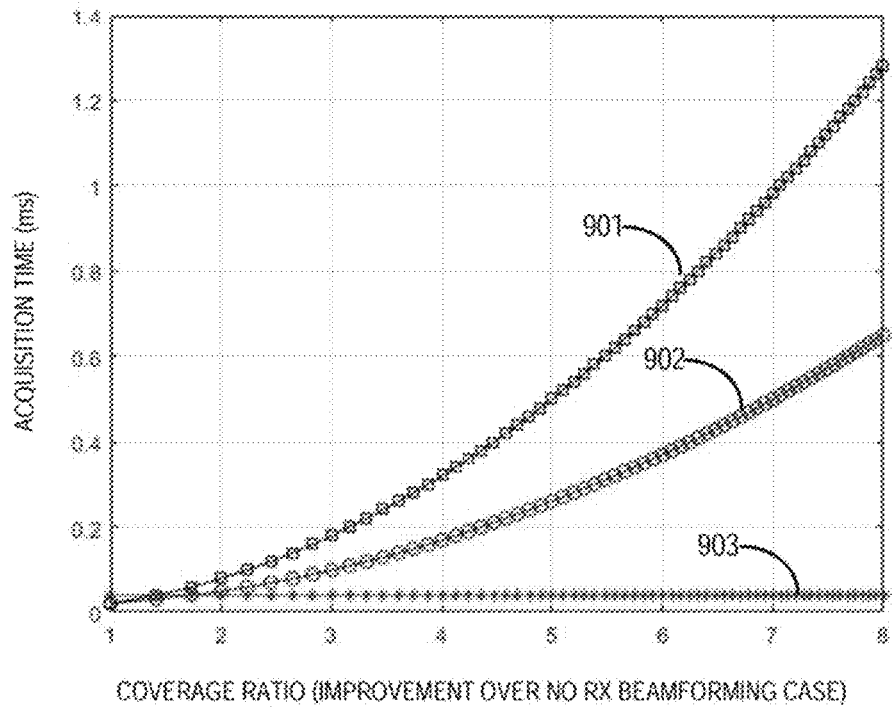
FIG. 9 depicts a graphical depiction of tradeoff curves between coverage and acquisition time.

Turning now to FIG. 9, there is shown a simulated comparison 900 of the coverage/acquisition tradeoff curves for different initial cell acquisition methodologies. As depicted, the first curve 901 depicts the worst-case acquisition time as a function of coverage which may be tuned by increasing the resolution of the receive RX beams (resulting in a larger number of receive RX beams to evaluate over), and the second curve 902 shows the average acquisition time with the baseline approach. In both curves 901, 902, the initial cell acquisition time increases significantly as the number of coverage ratio increases. With existing approaches for establishing initial cell acquisition, the curves 901, 902 represent different operational points. For instance, a hierarchical two-step method which makes initial RSSI measurements by choosing a lower coverage point and then uses the low-resolution sector information to "zoom in"

with a higher resolution results in a better acquisition time than by choosing the highest coverage point, but this approach suffers from many limitations including loss of coverage, such as with cell-edge users where the first stage may "miss" detection.

In contrast, the third curve 903 depicts the coverage vs acquisition time trade-off achieved with the disclosed multi-stage method for fast and robust cell search disclosed wherein the acquisition time is fixed, regardless of the coverage ratio. In particular, the computation of the RSSI values for each receiver RX beam during the first SSB burst allows the optimal receive RX beam and SSB frequency to be identified within a single SSB burst period. And once the user equipment is turned to the optimal RX beam and SSB frequency, the acquisition can complete within another SSB burst period (assuming the signal strength is sufficient), thus bounding the acquisition time to two SSB burst periods. As shown with the curve 903, the proposed two-stage initial acquisition method realizes maximum coverage (by using maximal receive beam resolution) with a fixed acquisition latency.

Figure 10:
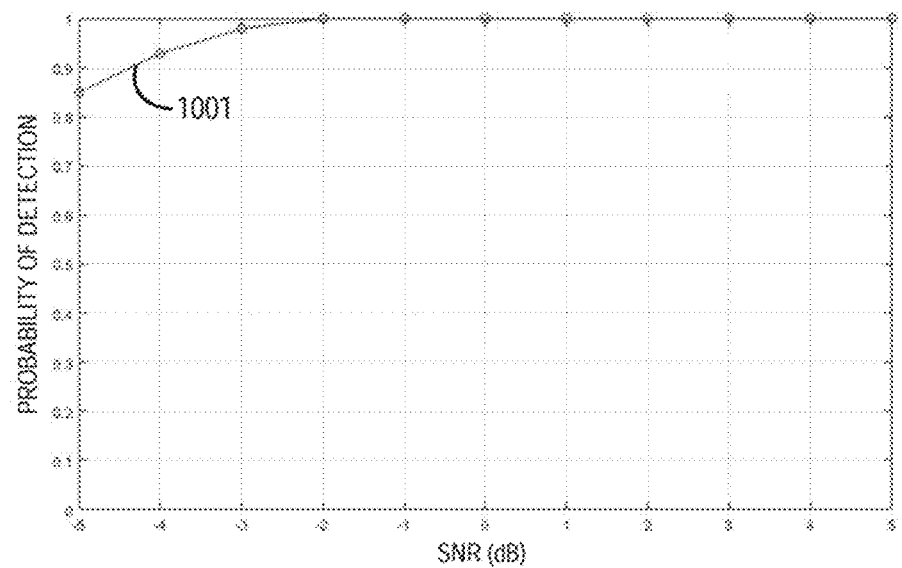
FIG. 10 depicts a graphical depiction of the probability of detection as a function of the signal-to-noise ratio.

Turning now to FIG. 10, there is shown a simulated graphical depiction 1000 of the probability of detection as a function of the signal-to-noise ratio. In particular, the curve 1001 shows that probability of detection of the correct receive RX beam within 1 SSB burst period approaches certainty as the signal-to-noise ratio exceeds −2 dB when using the disclosed two-stage method for fast and robust cell search. With the depicted simulations run under lowest range of SNRs characteristic of cell-edge users, it can be seen the detection performance is amazingly robust.

As these simulations show, optimal coverage with minimal acquisition latency and good SNR performance is achieved with the disclosed multi-stage initial acquisition approach which continuously sweeps the receive RX beams during each SSB transmit beam of a first SSB burst to compute RSSI values at each receive RX beam to find an optimal receive RX beam and SSB frequency that are then used to perform correlation based search during a second SSB burst. And by integrating RSSI values across adjacent receive beam sweeps, the effective window used to calculate the receive RX beam power during initial cell acquisition is increased to improve detection robustness under low SNR scenarios, thereby improving overall system performance.

By now it should be appreciated that there has been provided an apparatus, method, program code, and system for making initial access between a user equipment (UE) device and a base station in a multi-antenna system, such as a next generation 5G millimeter-wave wireless system. In the disclosed embodiments, the UE device continuously sweeps a plurality of receive beams over a first receiver sweep periods to generate a composite sample waveform of one or more synchronization signal blocks (SSB) transmitted by the base station in different transmit beams, where the first receiver sweep period has a duration that equals a duration of each SSB transmitted at each transmit beam. In selected embodiments, the continuous sweeping of receive beams includes sweeping a plurality of frequency bands at the user equipment device. In selected embodiments, the plurality of frequency bands may be swept at a first sweep rate that is faster than a second sweep rate for the plurality of receive beams such that a plurality of frequency bands is swept within a time duration of scanning one receive beam. In other embodiments, the plurality of receive beams is swept at a first sweep rate that is faster than a second sweep rate for the plurality of frequency bands such that a plurality of receive beams is swept within a time duration of scanning one frequency band. In selected embodiments, the receive beams are continuously swept by applying a plurality of receive beamforming weights to a multi-antenna subsystem at the user equipment device to directionally orient each of the plurality of receive beams in a different direction over the first receiver sweep period, and by jointly sweeping multiple frequency bands by applying a different center frequency to a front-end frequency tuner, when generating the composite sample waveform. In other embodiments, a plurality of M receive beams are continuously swept in a circular round-robin fashion for N receiver sweep periods to detect one or more synchronization signal blocks (SSB) transmitted by the base station in different transmit beams when generating the composite sample waveform, where each of the N receiver sweep periods has a duration that equals a duration for transmitting a single SSB. In addition, the UE device generates a composite received signal strength metric value from a batch of samples collected over the plurality of receive beams detected in the first receiver sweep period to detect one or more SSBs in the composite sample waveform. The UE device also searches the composite sample waveform for an optimal receive beam and an SSB receive frequency of any detected SSB. In selected embodiments, the search process includes generating a composite received signal strength metric value from a batch of samples collected over the plurality of receive beams detected in the first receiver sweep period; determining if the composite received signal strength metric value exceeds a first threshold value to identify one or more candidate SSB signals; transforming the composite sample waveform into a frequency domain signal if one or more candidate SSB signals is identified; and performing an SSB raster search in the frequency domain by sweeping a correlator across the frequency domain signal to identify an SSB frequency of the one or more candidate SSB signals. In addition, the process of searching the composite sample waveform may include selecting at least one of the plurality of receive beams as the optimal receive beam based on a ranking of a plurality of received signal strength metric values computed, respectively, for the plurality of receive beams. In selected embodiments, the process of selecting one of the plurality of receive beams may include choosing at least one receive beam if a corresponding received signal strength metric value exceeds a second threshold value. In other embodiments, received signal strength metric values derived from the composite sample waveform from the first receiver sweep period are used to jointly identify the optimal receive beam and the optimal SSB frequency. Finally, the UE device locks the UE device onto the optimal receive beam and SSB frequency to perform a cell search for matching a transmit beam from the base station to the optimal receive beam.

In another form, there is provided a wireless device (WD) and associated method of operation. The wireless device includes a multiple antenna subsystem, frequency tuner subsystem, and analog or digital beamformer subsystem connected to and configured by a digital controller to wirelessly make initial access with an access node (AN). In selected embodiments, the multiple antenna system may include a millimeter-wave antenna array that is configurable for communicating with a millimeter wave radio access technology system. As connected and configured, the wireless device continuously sweeps a plurality of receive beams over one or more receiver sweep periods at the WD to generate a composite sample waveform of one or more synchronization signal blocks (SSB) transmitted by the AN in different transmit beams, where each receiver sweep period has a duration that equals a duration of each SSB transmitted by the AN at each transmit beam. As configured, the wireless device also generates a composite received signal strength metric value from a batch of samples collected over the plurality of receive beams detected in the one or more receiver sweep periods to detect one or more SSBs in the composite sample waveform. In selected embodiments, the plurality of receive beams are continuously swept by applying a plurality of receive beamforming weights to a multi-antenna subsystem at the WD to directionally orient each of the plurality of receive beams in a different direction over the one or more receiver sweep period when generating the composite sample waveform. In such embodiments, the digital controller is also configured to continuously sweep a plurality of frequency bands by using the frequency tuner subsystem at the WD to scan the plurality of frequency beams while each receive beamforming weight is applied to the multi-antenna subsystem. Alternatively, the digital controller is configured to continuously sweep a plurality of frequency bands by using the frequency tuner subsystem at the WD to sequentially scan each of the plurality of frequency beams so that that beamformer subsystem can apply the plurality of receive beamforming weights to the multi-antenna subsystem while the WD is tuned to each frequency band. In addition, the digital controller is configured to jointly search the composite sample waveform for an optimal receive beam and an optimal SSB receive frequency band of any detected SSB. In selected embodiments, the joint search process includes generating a composite received signal strength metric value from a batch of samples collected over the plurality of receive beams detected in the one or more receiver sweep periods; determining if the composite received signal strength metric value exceeds a first threshold value to identify one or more candidate SSB signals; transforming the composite sample waveform into a frequency domain signal if one or more candidate SSB signals is identified; and performing an SSB raster search in the frequency domain by sweeping a correlator across the frequency domain signal to identify an SSB receive frequency of the one or more candidate SSB signals. In selected embodiments, the digital controller is configured to continuously sweep a plurality of frequency bands at a first sweep rate that is faster than a second sweep rate for the plurality of receive beams such that the plurality of frequency bands is swept within a time duration of scanning one receive beam. In other embodiments, the digital controller is configured to continuously sweep the plurality of receive beams at a first sweep rate that is faster than a second sweep rate for a plurality of frequency bands such that the plurality of receive beams is swept within a time duration of scanning one frequency beam. Finally, the digital controller is configured to lock the WD onto the optimal receive beam and optimal SSB frequency band to perform a cell search.

In yet another form, there is provided a communication device, method, program code, and system for making initial access with a base station in a multiple antenna wireless communication system, such as a next generation 5G millimeter-wave wireless system. In the disclosed embodiments, the communication device includes a multi-antenna array, such as a millimeter-wave antenna array that is configurable for communicating with a millimeter wave radio access technology (mmW RAT) system. In addition, the communication device may include a frequency tuner connected to tune the multi-antenna array to continuously sweep a plurality of frequency bands. In addition, the communication device includes a beamformer module connected to apply a plurality of receive beamforming weights to the multi-antenna array to directionally orient each of a plurality of receive beams in a different direction to continuously sweep the plurality of receive beams over a receiver sweep period to generate a composite sample waveform of one or more synchronization signal blocks (SSB) transmitted by the base station with different transmit beams during the first synchronization signal block (SSB) burst to the communication device. Finally, the communication device includes a digital signal processing controller configured to generate a composite received signal strength metric value from a batch of samples collected over the plurality of receive beams detected in the receiver sweep period to determine the presence of the SSB. The DSP controller is also configured to jointly search the composite signal waveform to identify an optimal SSB receive frequency band and optimal receive beam based on a ranking of a plurality of received signal strength metric values, where each received signal strength metric value is computed for each receive beam and SSB receive frequency band from samples of each transmitted SSB measured in said receive beam and SSB frequency band. In selected embodiments, the frequency tuner is configured to sweep the plurality of frequency bands at a first sweep rate that is faster than a second sweep rate for the plurality of receive beams such that the plurality of frequency bands is swept within a time duration of scanning one receive beam. In other embodiments, the beamformer module is configured to sweep the plurality of receive beams at a first sweep rate that is faster than a second sweep rate for the plurality of frequency bands such that the plurality of receive beams is swept within a time duration of scanning one frequency band.

The methods and systems for establishing initial cell acquisition with a multi-stage method which sweeps the UE's receive beams and SSB frequency bands during each SSB transmit beam of a first SSB burst to compute RSSI measurements which are used to identify an optimal receive beam and SSB frequency for completing cell acquisition during a second SSB burst in a 5G and millimeter-wave wireless communication system as shown and described herein may be implemented in whole or in part with software stored on a computer-readable medium and executed as a computer program on a general purpose or special purpose computer to perform certain tasks. For a hardware implementation, the elements used to perform various signal processing steps at the transmitter (e.g., receiving a SSB, designing the transmit beamforming vectors for a plurality of transmit beams, periodically transmitting the SSB over the transmit beams during a series of SSB bursts, and so on) and/or at the receiver (e.g., designing receive beamforming vectors for a plurality of receive beams, sweeping the receive beams to recover the transmitted SSB signal during each transmit beam, demodulating and decoding the recovered SSB signals, performing receive signal processing on samples received from the recovered SSB signals to calculate composite RSSI values for each receive beam, evaluating the composite RSSI values with vector processing techniques to select an optimal receive beam and identify the SSB frequency, performing a cell search using the optimal receive beam by searching for a synch pattern during a second SSB burst, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein focus on 5G and mm-wave systems and methods for using same, the present invention is not necessarily limited to the example embodiments illustrate herein and may be applied to any wireless system that uses beamforming to extend signal range, coverage and/or throughput. For example, various embodiments of an initial cell search system and design methodology disclosed herein may be implemented in connection with various proprietary or wireless communication standards, such as IEEE 802.16e, 3GPP-LTE, 4GPP-LTE, 5GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed at a user equipment device to make initial access with a base station in a multiple antenna system, comprising:
    continuously sweeping a plurality of receive beams over a first receiver sweep period at the user equipment device to generate a composite sample waveform of a plurality of synchronization signal blocks (SSB) transmitted by the base station in different transmit beams;
    generating a composite received signal strength metric value from a batch of samples collected over the plurality of receive beams detected in the first receiver sweep period to detect one or more SSBs in the composite sample waveform;
    searching the composite sample waveform for an optimal receive beam and an optimal receive SSB frequency of any detected SSB; and
    locking the user equipment device onto the optimal receive beam and optimal SSB receive frequency to perform a cell search.

2. The method of claim 1, where continuously sweeping the plurality of receive beams comprises sweeping a plurality of frequency bands at the user equipment device.

3. The method of claim 1, where continuously sweeping the plurality of receive beams comprises applying a plurality of receive beamforming weights to a multi-antenna subsystem at the user equipment device to directionally orient each of the plurality of receive beams in a different direction over the first receiver sweep period when generating the composite sample waveform.

4. The method of claim 1, where continuously sweeping the plurality of receive beams comprises continuously sweeping a plurality of m receive beams in a circular round-robin fashion for n receiver sweep periods to detect one or more SSBs transmitted by the base station in different transmit beams when generating the composite sample waveform, where each of the n receiver sweep periods has a duration that equals a duration for transmitting a single SSB.

5. The method of claim 1, where searching the composite sample waveform comprises:
    generating a composite received signal strength metric value from a batch of samples collected over the plurality of receive beams detected in the first receiver sweep period;
    determining if the composite received signal strength metric value exceeds a first threshold value to identify one or more candidate SSB signals;
    transforming the composite sample waveform into a frequency domain signal if one or more candidate SSB signals is identified; and
    performing an SSB raster search in the frequency domain by sweeping a correlator across the frequency domain signal to identify one or more SSB frequencies for the one or more candidate SSB signals.

6. The method of claim 5, where searching the composite sample waveform comprises selecting at least one of the plurality of receive beams and one of the one or more SSB frequencies as the optimal receive beam and optimal SSB frequency, respectively, based on a ranking of a plurality of received signal strength metric values computed per-receive beam and per-SSB frequency.

7. The method of claim 6, where selecting at least one of the plurality of receive beams comprises choosing at least one receive beam if a corresponding received signal strength metric value exceeds a second threshold value.

8. The method of claim 2, where the plurality of frequency bands is swept at a rate faster than a sweep rate for the plurality of receive beams such that a plurality of frequency bands is swept within a time duration of scanning one receive beam.

9. The method of claim 2, where the plurality of receive beams is swept at a rate faster than a sweep rate for the plurality of frequency bands such that a plurality of receive beams is swept within a time duration of scanning one frequency band.

10. The method of claim 1, further comprising computing received signal strength metric values derived from the composite sample waveform for use in jointly identifying the optimal receive beam and the optimal SSB frequency.

11. A wireless device (WD) comprising:
a multiple antenna subsystem, frequency tuner subsystem and beamformer subsystem connected to and configured by a digital controller to wirelessly make initial access with an access node (AN) by:
continuously sweeping a plurality of receive beams over one or more receiver sweep periods at the WD to generate a composite sample waveform of a plurality of synchronization signal blocks (SSB) transmitted by the AN in different transmit beams;
generating a composite received signal strength metric value from a batch of samples collected over the plurality of receive beams detected in the one or more receiver sweep periods to detect one or more SSBs in the composite sample waveform;
jointly searching the composite sample waveform for an optimal receive beam and an optimal SSB receive frequency band of every detected SSB; and
locking the WD onto the optimal receive beam and optimal SSB receive frequency band to perform a cell search.

12. The wireless device of claim 11, where the multiple antenna system comprises a millimeter-wave antenna array that is configurable for communicating with a millimeter wave radio access technology system.

13. The wireless device of claim 11, where the digital controller is configured to continuously sweep the plurality of receive beams by applying a plurality of receive beamforming weights to a multi-antenna subsystem at the WD to directionally orient each of the plurality of receive beams in a different direction over the one or more receiver sweep periods when generating the composite sample waveform.

14. The wireless device of claim 13, where the digital controller is configured to continuously sweep a plurality of frequency bands by using the frequency tuner subsystem at the to scan the plurality of frequency beams while each receive beamforming weight is applied to the multi-antenna subsystem.

15. The wireless device of claim 13, where the digital controller is configured to continuously sweep a plurality of frequency bands by using the frequency tuner subsystem at the wd to sequentially scan each of the plurality of frequency bands so that that beamformer subsystem can apply the plurality of receive beamforming weights to the multi-antenna subsystem while the wd is tuned to each frequency band.

16. The wireless device of claim 11, where the digital controller is configured to jointly search the composite sample waveform for the optimal receive beam and optimal SSB receive frequency band by:
generating a composite received signal strength metric value from a batch of samples collected over the plurality of receive beams detected in the one or more receiver sweep periods;
determining if the composite received signal strength metric value exceeds a first threshold value to identify one or more candidate SSB signals;
transforming the composite sample waveform into a frequency domain signal if one or more candidate SSB signals is identified; and
performing an SSB raster search in the frequency domain by sweeping a correlator across the frequency domain signal to identify an SSB receive frequency of the one or more candidate SSB signals.

17. The wireless device of claim 11, where the digital controller is configured to continuously sweep a plurality of frequency bands at a first sweep rate that is faster than a second sweep rate for the plurality of receive beams such that the plurality of frequency bands is swept within a time duration of scanning one receive beam.

18. The wireless device of claim 11, where the digital controller is configured to continuously sweep the plurality of receive beams at a first sweep rate that is faster than a second sweep rate for a plurality of frequency bands such that the plurality of receive beams is swept within a time duration of scanning one frequency band.

19. A communication device for making initial access with a base station in a multiple antenna wireless communication system, comprising:
a multi-antenna array;
a beamformer module connected to apply a plurality of receive beamforming weights to the multi-antenna array to directionally orient each of a plurality of receive beams in a different direction to continuously sweep the plurality of receive beams over a receiver sweep period to generate a composite sample waveform of a plurality of synchronization signal blocks (SSB) transmitted by the base station with different transmit beams during the first synchronization signal block (SSB) burst to the communication device; and
a digital signal processing controller configured to generate a composite received signal strength metric value from a batch of samples collected over the plurality of receive beams detected in the receiver sweep period to determine the presence of the SSB and to jointly search the composite sample waveform to identify an optimal SSB receive frequency band and an optimal receive beam based on a ranking of a plurality of received signal strength metric values, where each received signal strength metric value is computed for each receive beam and SSB receive frequency band from samples of each transmitted SSB measured in said receive beam and SSB frequency band.

20. The communication device of claim 19, further comprising a frequency tuner connected to tune the multi-antenna array to continuously sweep a plurality of frequency bands at a first sweep rate that is faster than a second sweep rate for sweeping the plurality of receive beams such that the plurality of frequency bands is swept within a time duration of scanning one receive beam.

* * * * *